(12) United States Patent
Sugeno et al.

(10) Patent No.: US 10,389,142 B2
(45) Date of Patent: Aug. 20, 2019

(54) ELECTRIC STORAGE SYSTEM

(71) Applicant: Murata Manufacturing Co., Ltd., Kyoto (JP)

(72) Inventors: Naoyuki Sugeno, Fukushima (JP); Kohki Watanabe, Fukushima (JP); Kazuharu Yanagihara, Fukushima (JP); Noritoshi Imamura, Miyagi (JP); Yusuke Suzuki, Fukushima (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 105 days.

(21) Appl. No.: 15/329,701

(22) PCT Filed: Jun. 25, 2015

(86) PCT No.: PCT/JP2015/003197
§ 371 (c)(1),
(2) Date: Jan. 27, 2017

(87) PCT Pub. No.: WO2016/027400
PCT Pub. Date: Feb. 25, 2016

(65) Prior Publication Data
US 2017/0207637 A1    Jul. 20, 2017

(30) Foreign Application Priority Data

Aug. 21, 2014   (JP) .................................. 2014-168454

(51) Int. Cl.
*H02J 7/00* (2006.01)
*H02J 3/32* (2006.01)
(Continued)

(52) U.S. Cl.
CPC ............ *H02J 7/0021* (2013.01); *B60L 53/65* (2019.02); *B60L 53/665* (2019.02); *B60L 55/00* (2019.02);
(Continued)

(58) Field of Classification Search
USPC .................................................. 320/118, 126
See application file for complete search history.

(56) References Cited

U.S. PATENT DOCUMENTS 5,666,040 A * 9/1997 Bourbeau ............. H01M 2/348
320/118
2011/0127964 A1   6/2011 Nishida et al.
(Continued)

FOREIGN PATENT DOCUMENTS

| CN | 102549871 | 7/2012 |
|---|---|---|
| GB | 2341258 A | 3/2000 |

(Continued)

OTHER PUBLICATIONS

Japanese Office Action dated May 29, 2018 in corresponding Japanese Application No. 2014-168454.
(Continued)

*Primary Examiner* — Brian Ngo
(74) *Attorney, Agent, or Firm* — K&L Gates LLP

(57) ABSTRACT

Provided is an electric storage system including: a plurality of electric storage devices including a plurality of modules, a battery management unit, and a line concentrator connected with the battery management unit; wherein the plurality of modules include a battery unit, a voltage measurement unit, a temperature measurement unit and a current measurement unit, and wherein the battery management unit is configured to control at least one of the plurality of electric storage devices based on an instruction transmitted from the line concentrator.

19 Claims, 12 Drawing Sheets

(51) Int. Cl.
  *B60L 55/00*  (2019.01)
  *B60L 53/65*  (2019.01)
  *B60L 53/66*  (2019.01)
  *B60L 58/10*  (2019.01)
  *H01M 10/42*  (2006.01)

(52) U.S. Cl.
  CPC ............... *B60L 58/10* (2019.02); *H02J 3/32* (2013.01); *H02J 7/0013* (2013.01); *H02J 7/0019* (2013.01); *B60L 2240/545* (2013.01); *B60L 2240/547* (2013.01); *B60L 2240/549* (2013.01); *H01M 10/425* (2013.01); *H01M 2010/4271* (2013.01); *Y02E 60/721* (2013.01); *Y02T 10/7005* (2013.01); *Y02T 10/705* (2013.01); *Y02T 10/7072* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 10/126* (2013.01); *Y04S 30/14* (2013.01)

(56) References Cited

U.S. PATENT DOCUMENTS

| | | | |
|---|---|---|---|
| 2012/0212183 A1* | 8/2012 | Yamada | H02J 3/32 320/126 |
| 2012/0228946 A1 | 9/2012 | Sim et al. | |
| 2013/0221919 A1 | 8/2013 | Gallegos et al. | |
| 2013/0249475 A1 | 9/2013 | Kang et al. | |
| 2014/0327403 A1 | 11/2014 | Yokoura et al. | |
| 2017/0207637 A1* | 7/2017 | Sugeno | B60L 11/1851 |

FOREIGN PATENT DOCUMENTS

| | | |
|---|---|---|
| JP | 2006114423 | 4/2006 |
| JP | 2010-045923 A | 2/2010 |
| JP | 2010029015 | 2/2010 |
| JP | 2012-182903 A | 9/2012 |
| JP | 2013-070441 | 4/2013 |
| JP | 2013179834 | 9/2013 |
| JP | 2014-103831 | 6/2014 |
| WO | 2012132177 | 10/2012 |
| WO | 2013/128808 | 9/2013 |
| WO | 2014/020830 A1 | 2/2014 |
| WO | 2012/114479 | 7/2014 |

OTHER PUBLICATIONS

International Search Report dated Sep. 8, 2015 in corresponding international application No. PCT/JP2015/003197 (4 pages).
Written Opinion dated Sep. 8, 2015 in corresponding international application No. PCT/JP2015/003197 (9 pages).
Office Action for Japanese counterpart Application No. 2014-168454; dated Feb. 20, 2018; (5 pages).
Japanese Office Action dated Aug. 21, 2018 in corresponding Japanese Application No. 2014-168454.
Chinese Office Action dated Jan. 31, 2019, in corresponding Chinese Application No. 201580043615.5.

\* cited by examiner

[Fig. 1]
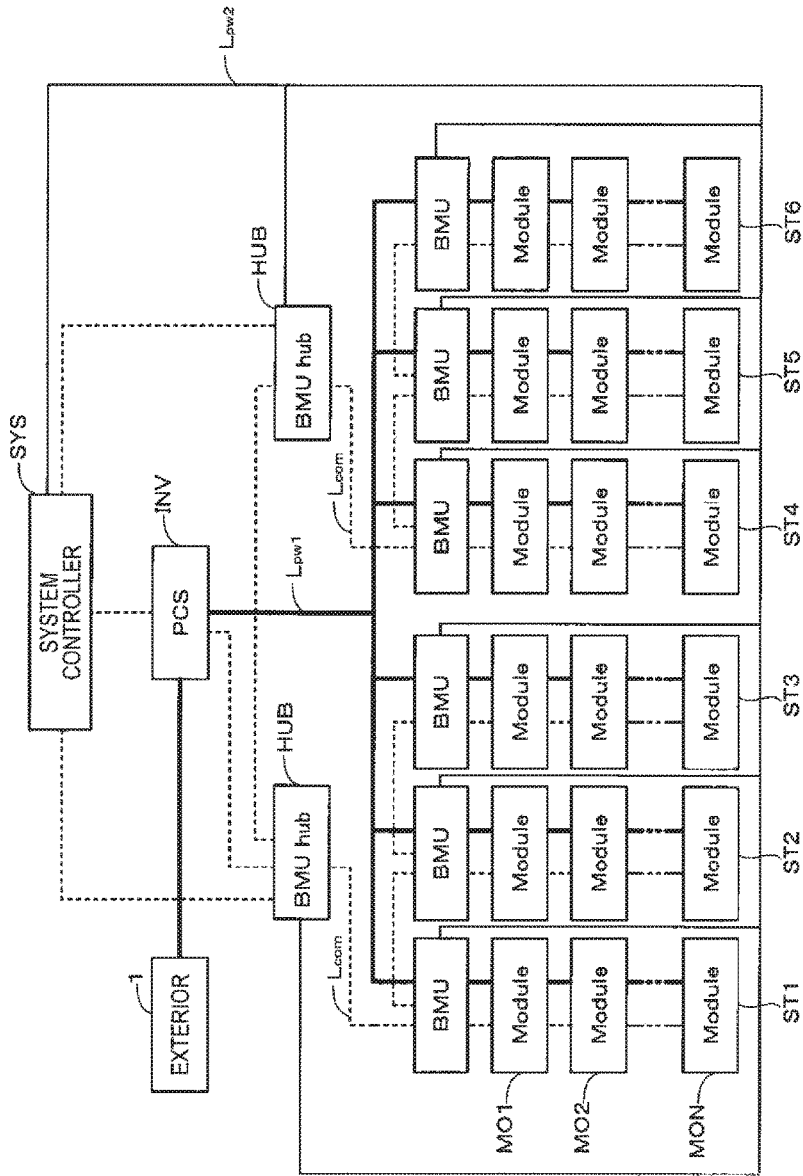

[Fig. 2]
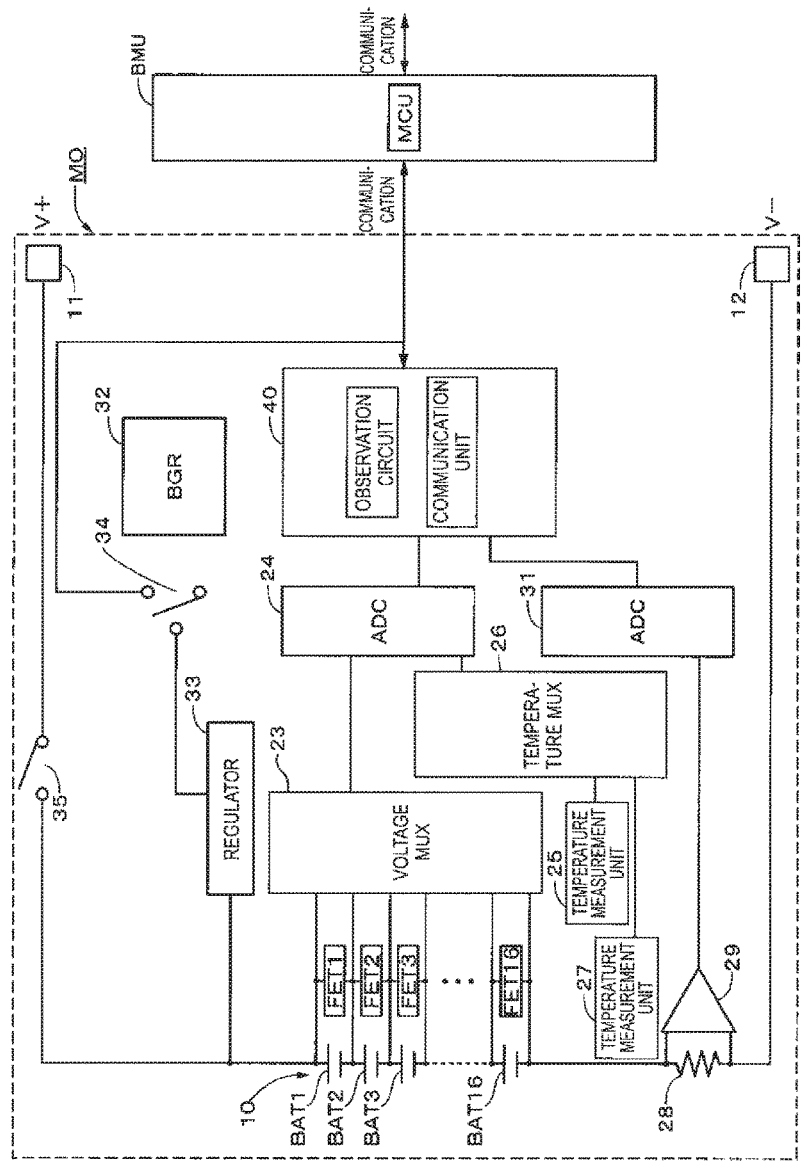

[Fig. 3]
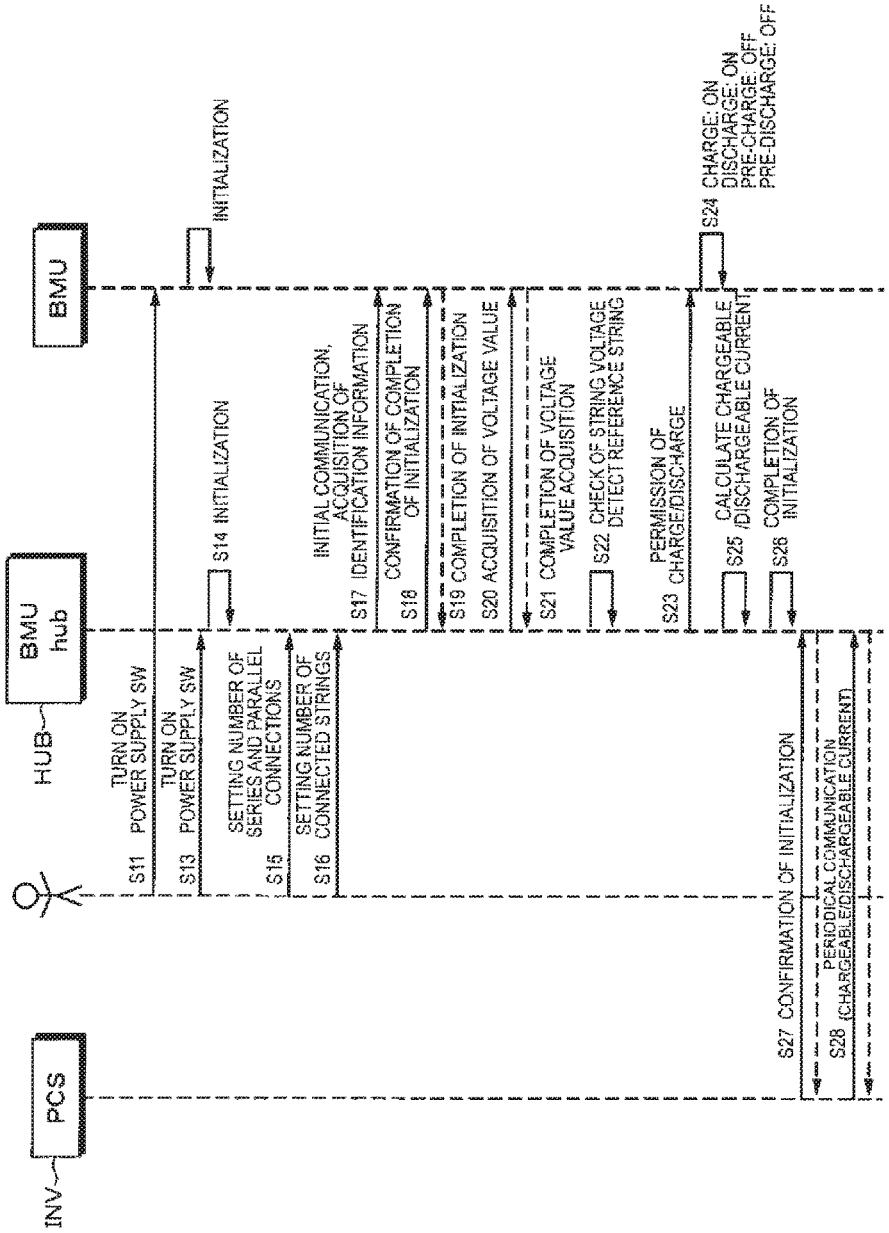

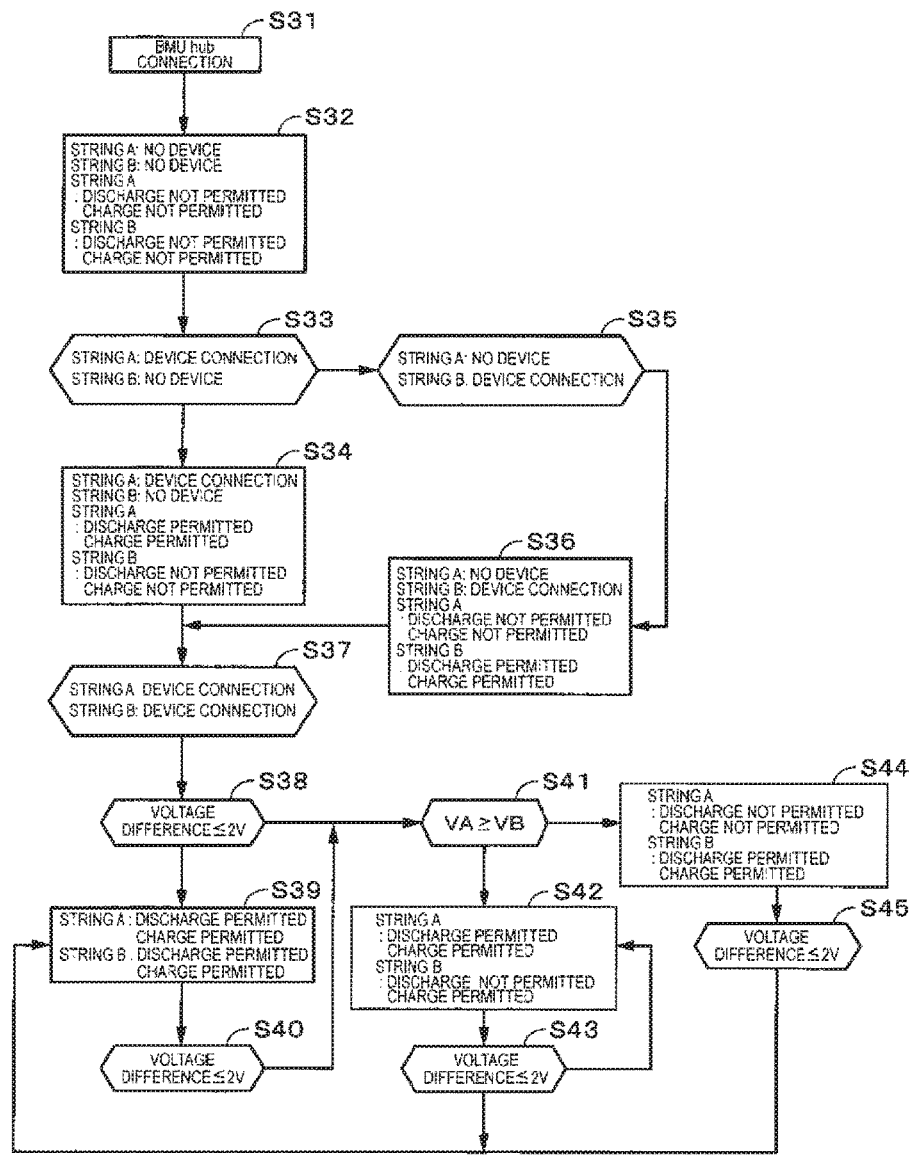

[Fig. 5]
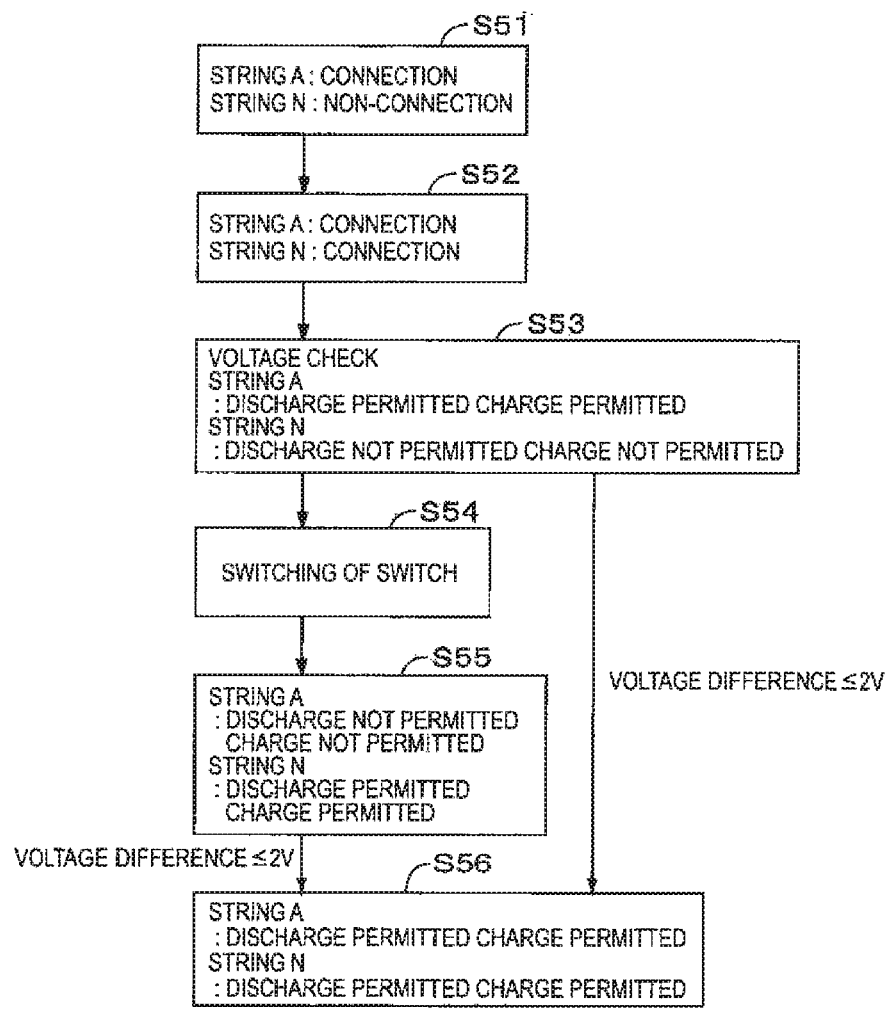

[Fig. 6]
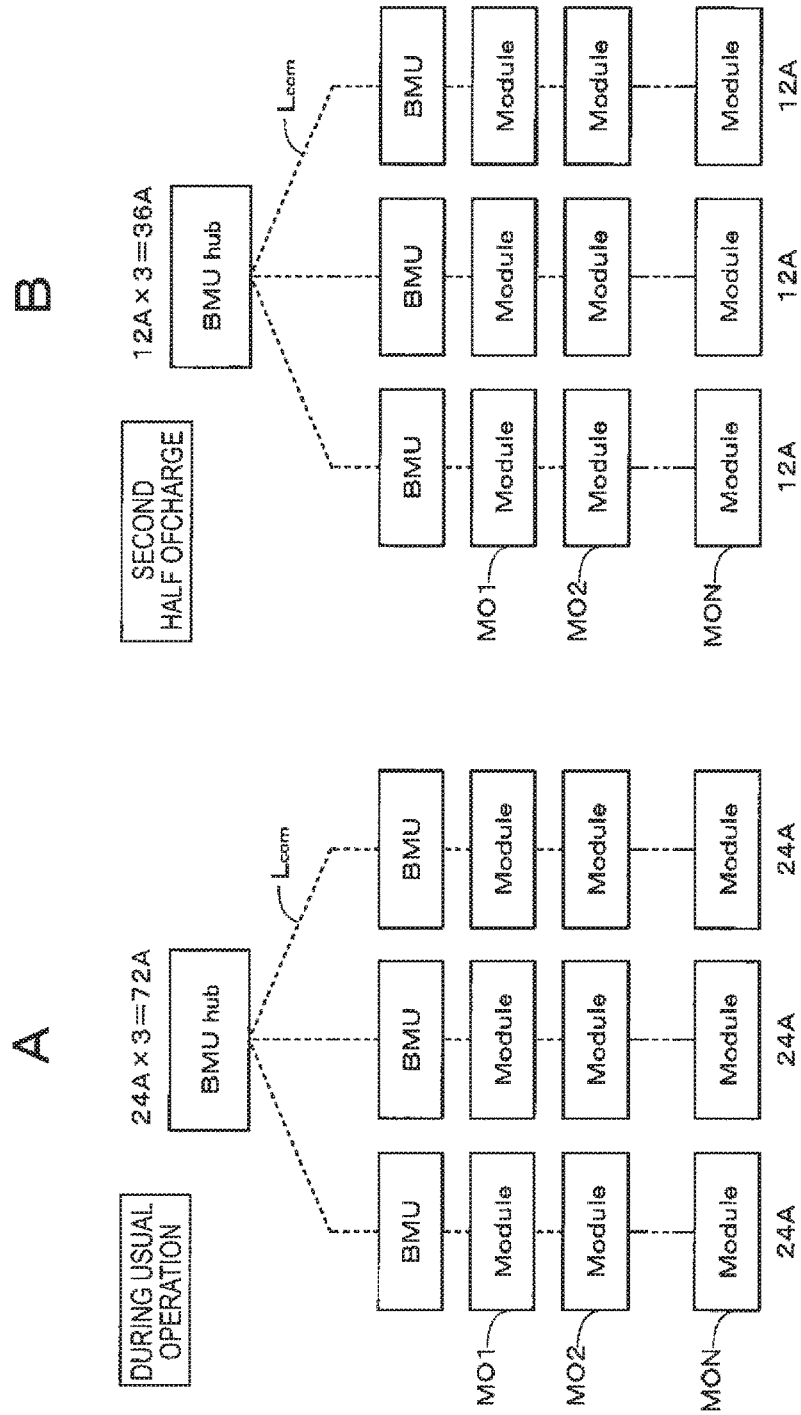

[Fig. 7]
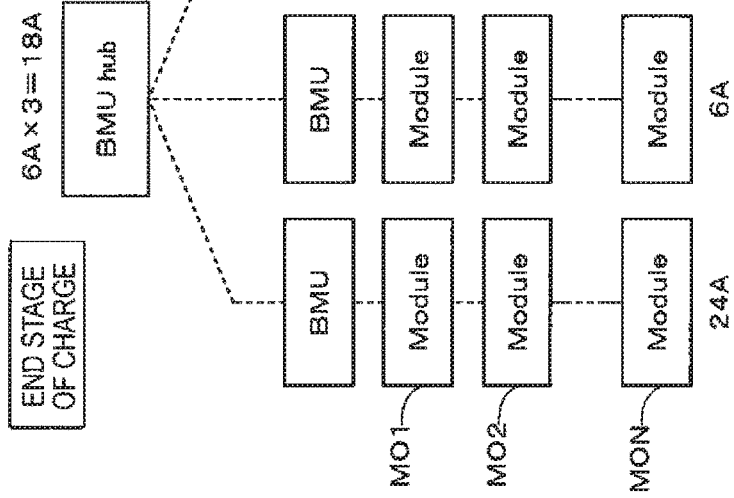
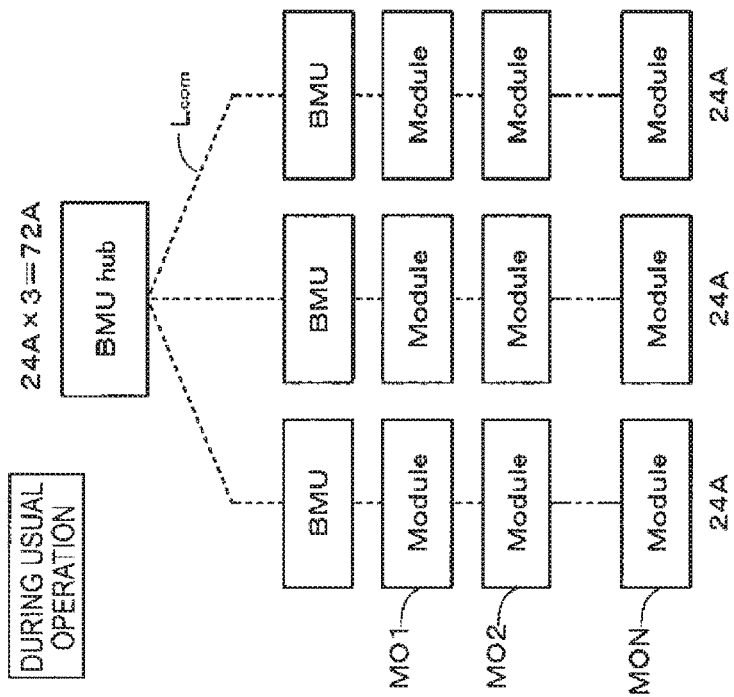

[Fig. 8]
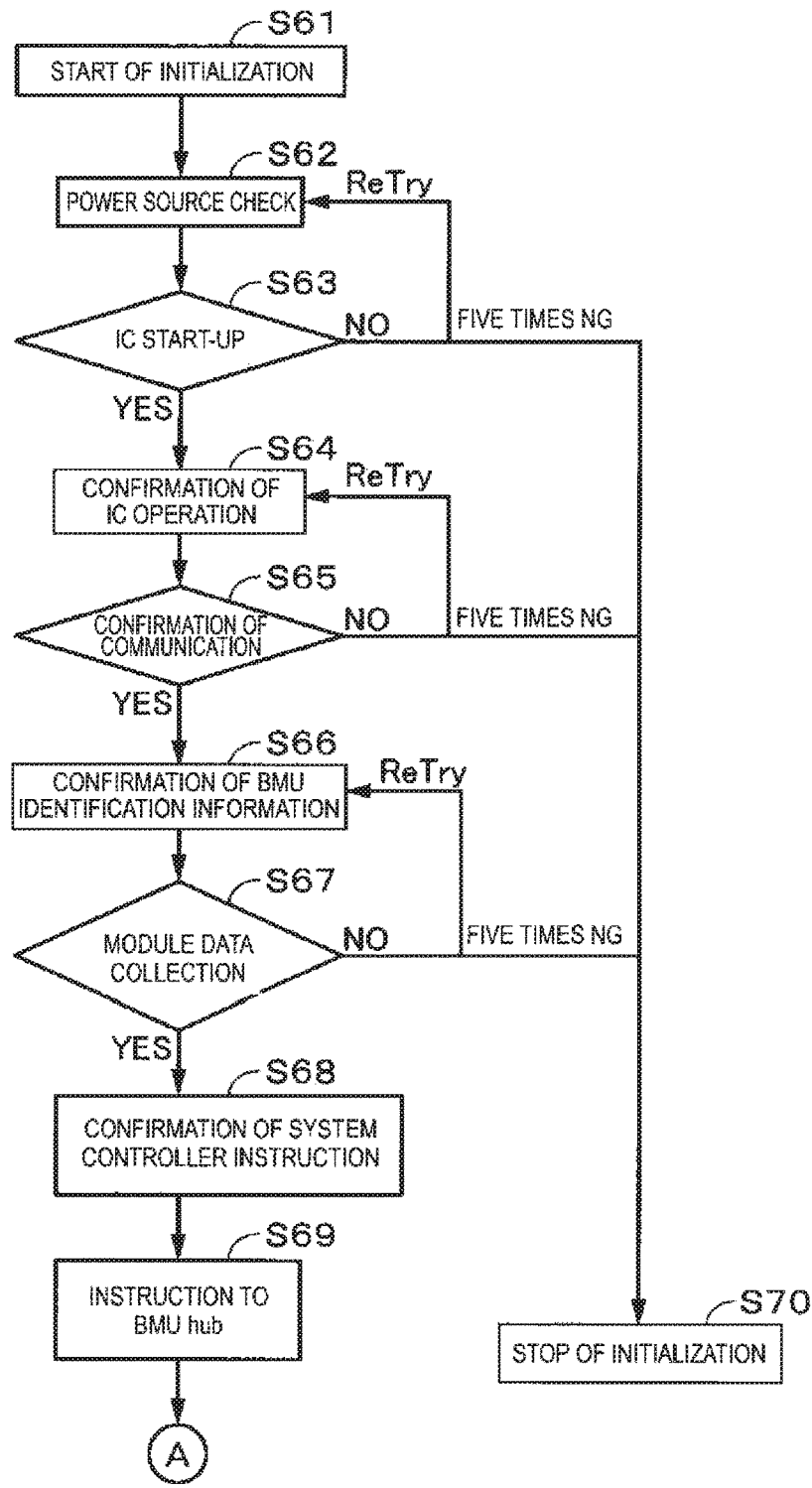

[Fig. 9]
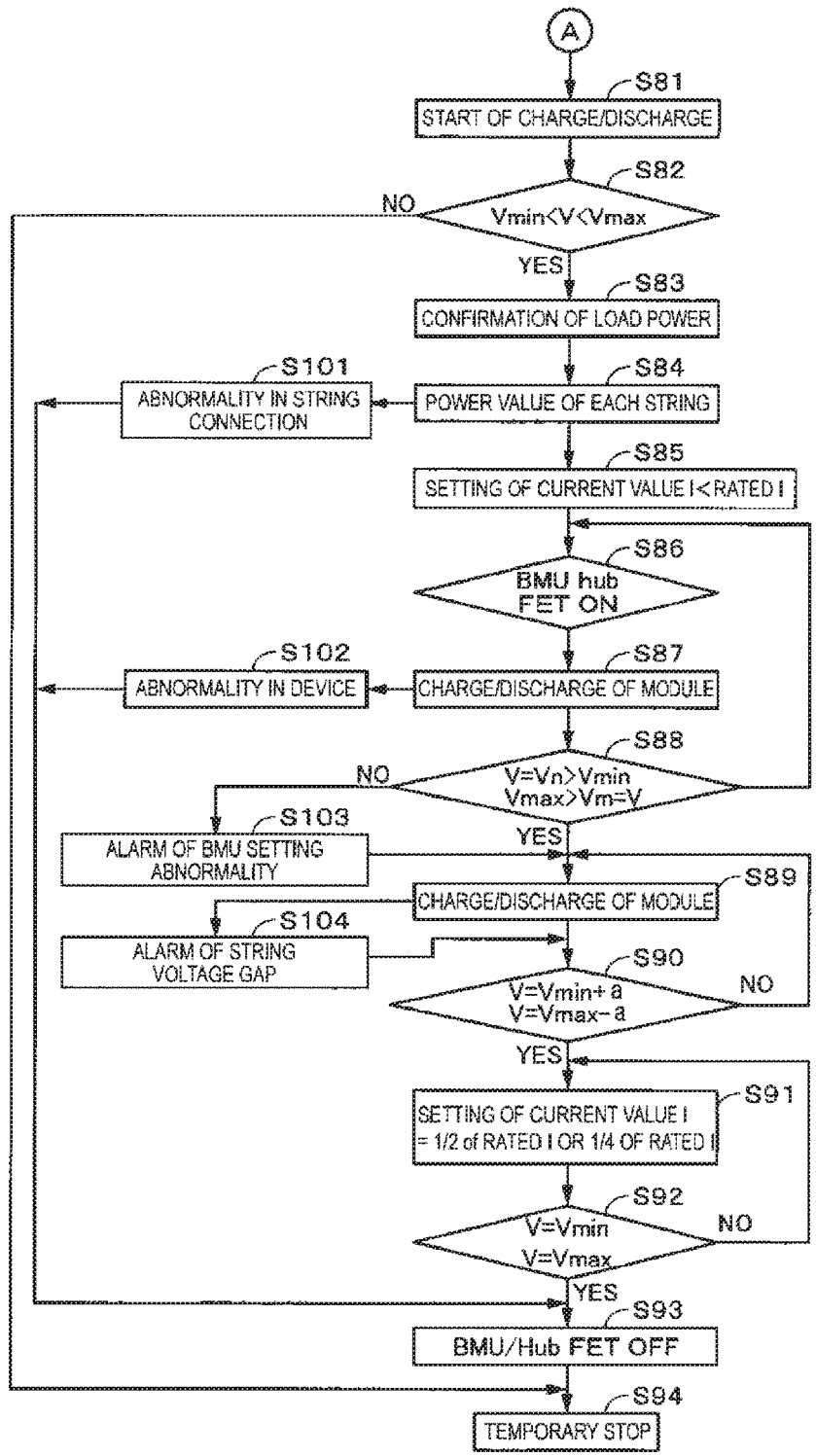

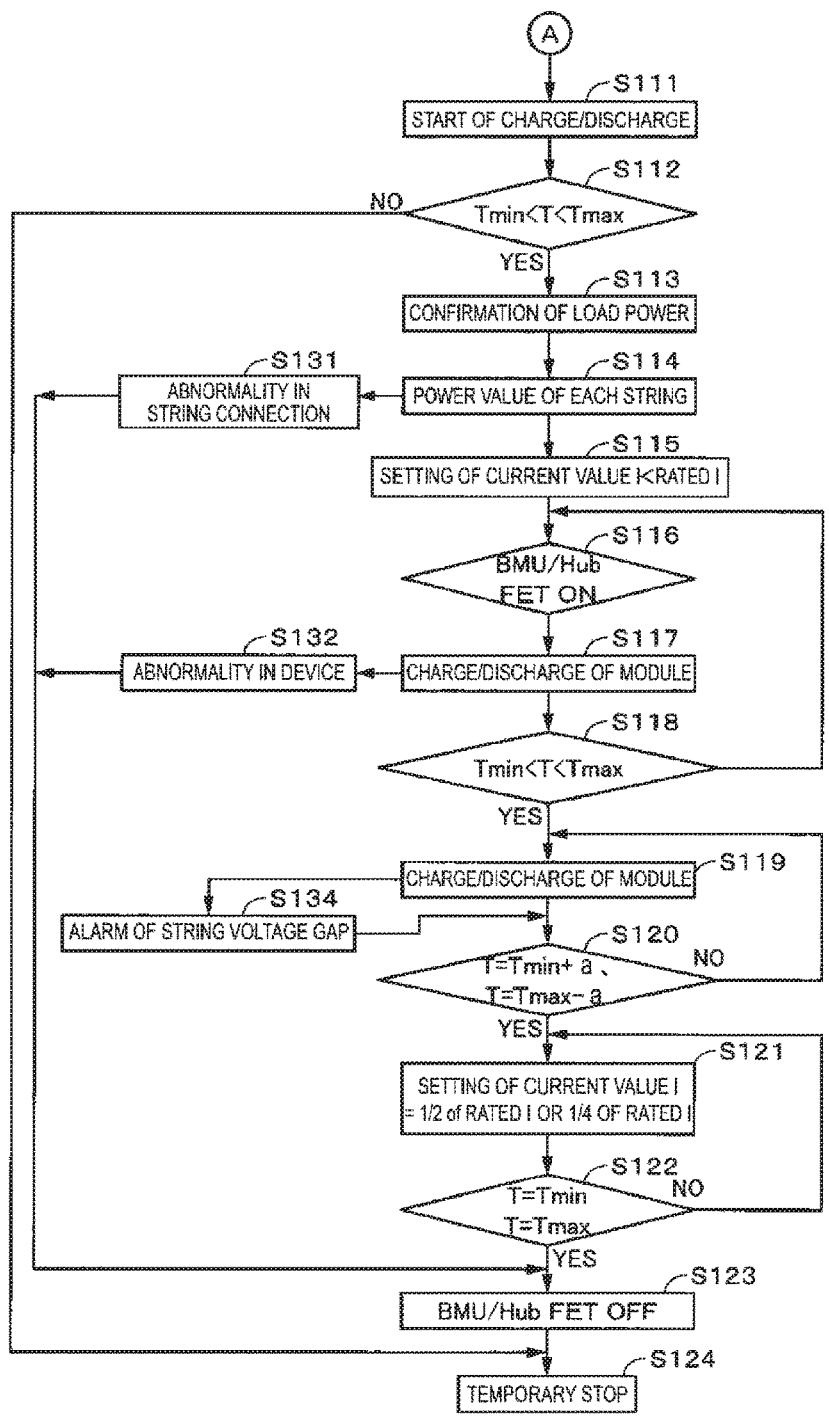
[Fig. 10]

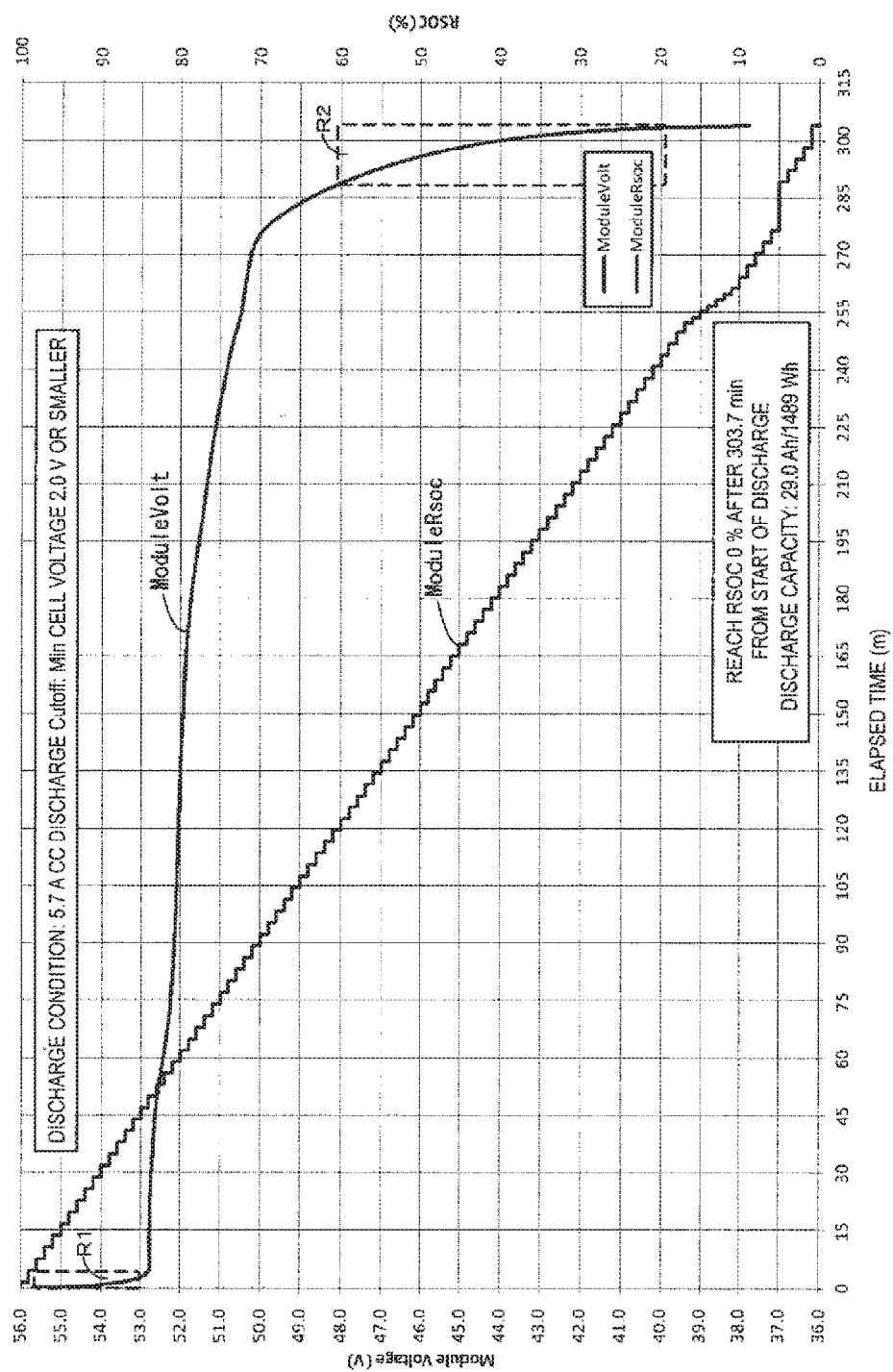
[Fig. 11]

[Fig. 12]
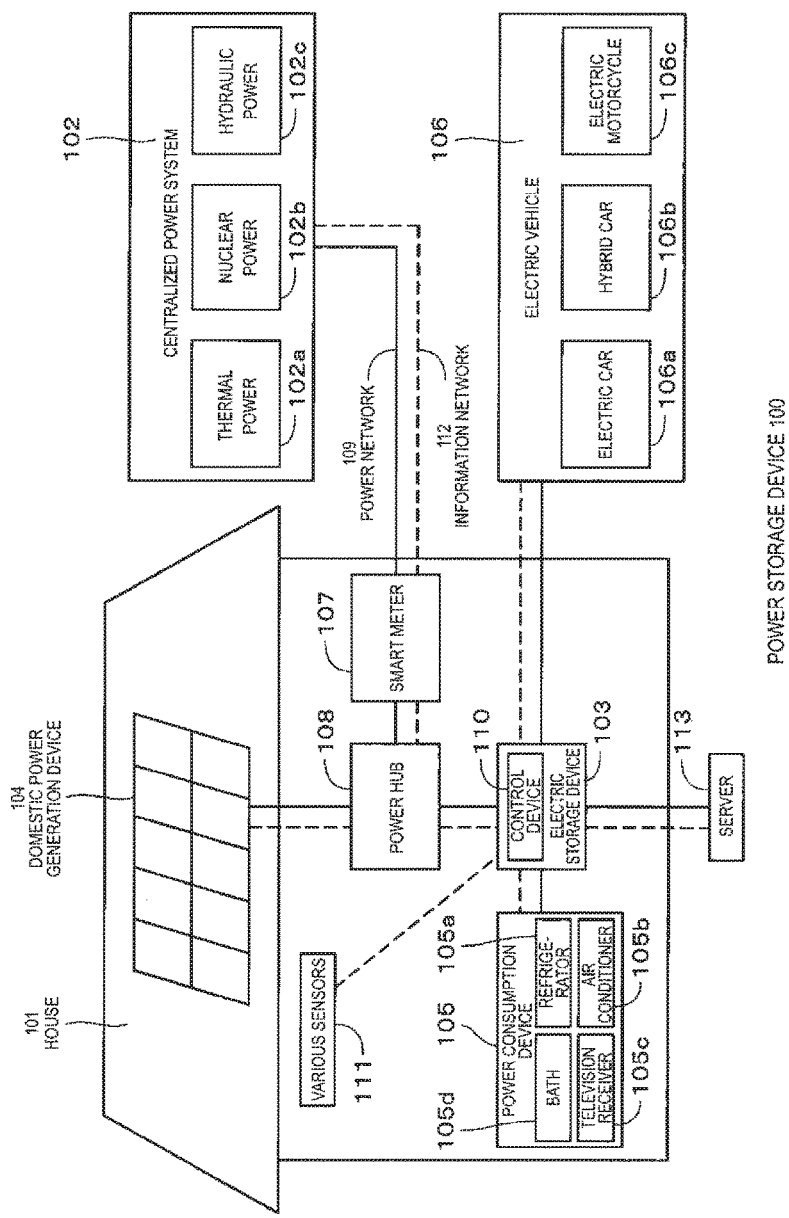

ELECTRIC STORAGE SYSTEM

CROSS REFERENCE TO RELATED APPLICATIONS

The present application claims the benefit of International Application No. PCT/JP2015/003197, filed Jun. 25,2015, which claims priority to Japanese Application No. 2014-168454, filed Aug. 21, 2014, the disclosures of which are incorporated herein by reference.

BACKGROUND

The present technology relates to an electric storage system.

In recent years, applications of secondary batteries such as lithium ion secondary batteries are rapidly spreading to electric storage systems for storing power in combination with new energy systems such as solar batteries and wind power generation. Electric storage systems connected with one or a plurality of electric storage devices are used to generate a large quantity of power.

Technologies related to the electric storage systems are disclosed in the following Patent Literature 1 to Patent Literature 3.

CITATION LIST

Patent Literature

PTL 1: US 2013/0249475A
PTL 2: JP 2012-182903A
PTL 3: JP 2010-45923A

SUMMARY

Technical Problem

A stable operation is necessary in an electric storage system.

Therefore, it is desirable to provide an electric storage system that can be stably operated.

Solution to Problem

According to an embodiment of the present technology, there is provided an electric storage system including: a plurality of electric storage devices including a plurality of modules, a battery management unit, and a line concentrator connected with the battery management unit; wherein the plurality of modules include a battery unit, a voltage measurement unit, a temperature measurement unit and a current measurement unit, and wherein the battery management unit is configured to control at least one of the plurality of electric storage devices based on an instruction transmitted from the line concentrator.

Advantageous Effects of Invention

According to an embodiment of the present technology, an electric storage system that can be stably operated is provided.

BRIEF DESCRIPTION OF DRAWINGS

FIG. 1 is a block diagram that shows an exemplary configuration of an electric storage system according to an embodiment of the present technology.

FIG. 2 is a block diagram that shows an exemplary configuration of a module MO that is an example of a power unit.

FIG. 3 is a sequence diagram that shows an initialization processing.

FIG. 4 is a flow chart that shows an exemplary control of charge and discharge permission.

FIG. 5 is a flow chart that shows an exemplary control of the charge and discharge permission in the case where the number of connected strings changes.

FIG. 6A and FIG. 6B each is a schematic diagram that shows an outline of a current control method according to a line concentrator HUB.

FIG. 7A and FIG. 7B each is a schematic diagram that shows an outline of a current control method according to a line concentrator HUB.

FIG. 8 is a flow chart that shows an operation after an initialization of the line concentrator HUB is started.

FIG. 9 is a flow chart that shows a charge/discharge control of an electric storage system by voltage observation.

FIG. 10 is a flow chart that shows a charge/discharge control by temperature observation.

FIG. 11 shows exemplary discharge characteristics of a module that uses a secondary battery that contains a positive electrode active material having an olivine structure as a positive electrode material.

FIG. 12 is a block diagram of an application example of the electric storage system.

DETAILED DESCRIPTION

Hereinafter, embodiments of the present technology will be described with reference to the drawings. Incidentally, the description will be given in the following order. 1. An embodiment, 2. An application example, and 3. Other embodiments (modification examples).

(Configuration of Electric Storage System)

FIG. 1 is a block diagram that shows an exemplary configuration of an electric storage system according to an embodiment of the present technology. As shown in FIG. 1, the electric storage system according to an embodiment of the present technology includes: an electric storage device made of a plurality of modules MO and a battery management unit BMU; a line concentrator (BMU hub) HUB connected with a plurality of battery management units BMU by a communication line $L_{com}$ that is a communication passage; a power conditioning system (INV); and a system controller SYS. The battery management unit BMU that is a common controller to the plurality of the modules MO1 to MON is provided.

The electric storage device configured with the plurality of modules MO1 to MON and the battery management unit BMU is called as a string ST. The strings ST1 to ST6 arranged in parallel are connected to the power conditioning system INV. Incidentally, when there is no need of differentiating individual strings, the individual string is described optionally as the string ST.

The plurality of modules MO1 to MON have a configuration in which, for example, N (N=an integer of 2 or more) pieces of module MO1, module MO2, module MO3 ... module MON are connected in series. Incidentally, when there is no need of differentiating between individual modules, the individual module is described optionally as the module MO. The number of the modules MO and a connection mode of the modules MO can be properly changed. For example, N modules MO connected in series may be connected in parallel.

In the electric storage system, power stored in the module MO is supplied to a direct current power line (DC power bus) $L_{pw1}$, and the power is supplied to an exterior 1 through the power conditioning system INV. Further, the power is supplied from the exterior 1, and the power is supplied to the module MO from the exterior 1 via the power line $L_{pw1}$ through the power conditioning system INV. The exterior 1 is, for example, a load, an AC power system, etc., and is set depending on the use of the electric storage system.

In the power conditioning system INV, the direct current power supplied from the module MO is converted into alternating current power and supplied to the exterior 1. In the power conditioning system INV, alternating current power supplied from the exterior 1 is converted into direct current power and may be supplied to the module MO.

In conjunction with a supply operation of the power, communication is performed between the system controller SYS and the power conditioning system INV as well as the line concentrator HUB, between the line concentrator HUB and the power conditioning system INV, between the line concentrator HUB and the battery management unit BMU, between the battery management units BMU, and between modules MO according to a standard such as recommended standard 232 version C (RS-232C), RS-485, and a control area network (CAN).

An example of the module MO includes an exterior case, a battery block housed in the exterior case, etc. In the exterior case, it is desirable to use, for example, a material having high conductivity and radiation factor. When the material having high conductivity and radiation factor is used, an excellent heat radiation property in the exterior case can be obtained. By obtaining excellent heat radiation property, a temperature increase in the exterior case can be suppressed. Further, high dust-proof/drip-proof performance can be realized because an opening part of the exterior case can be minimized or abolished. For the exterior case, materials such as aluminum or an aluminum alloy, copper, a copper alloy, etc. can be used.

The battery block includes, for example, a plurality of (for example, 16 pieces) lithium ion secondary batteries connected in parallel. In the exterior case, for example, a plurality of the battery blocks are connected in series. The number and the connection mode of the battery blocks can be properly changed. Further, a power storage element such as a secondary battery other than the lithium ion secondary battery may be used. For example, when an output voltage per one lithium ion secondary battery is taken as 3.2 V, an output voltage per one module is approximately 51.2 V (3.2 V times 16). That is, the string ST provided with N (N=an integer equal to 1 or more) modules MO can supply a voltage of approximately 51.2 times N (V).

The battery management unit BMU that is a host controller common to the plurality of the modules MO is provided. The battery management unit BMU collects data from each module MO. That is, the battery management unit BMU acquires data of a voltage, a state of charge (SOC: remaining capacity rate), a charge current, a discharge current and a battery temperature of each battery BAT of a battery unit 10 by communication. A bidirectional communication according to a standard such as I2C and system management bus (SMBus), which are standards of serial communication, a serial peripheral interface (SPI), and a control area network (CAN) is performed between the module MO and the battery management unit BMU. The communication may be performed by a cable communication or a wireless communication.

The battery management unit BMU controls charge permission or charge prohibition of the plurality of modules MO. For example, the battery management unit BMU receives an instruction from the line concentrator HUB by communication, and controls the charge permission or the charge prohibition. For example, the battery management unit BMU transmits a charge permission instruction to the module MO of which charge permission is determined. The module MO that has received the charge permission instruction turns on a charge switch element. However, in the case where a condition of an overcharge etc. of the battery is satisfied, the charge switch element is turned off. The module MO that has not received the charge permission instruction turns off the charge switch element.

(Configuration of Module MO)

FIG. 2 is a block diagram that shows an exemplary configuration of a module MO that is an example of a power unit. The module MO includes, for example, 16 batteries BAT1, BAT2, BAT3 . . . BAT16 connected in series as the battery unit 10. Each of the battery BAT1 to the battery BAT16 is, for example, an electric cell or a plurality of electric cells (assembled battery) that are connected in parallel. Incidentally, when there is no need of differentiating individual batteries, the individual battery is described optionally as the battery BAT.

The battery BAT is a lithium ion secondary battery, for example. A positive electrode side of the battery BAT1 is connected to a positive electrode terminal 11 of the module MO. A negative electrode side of the battery BAT16 is connected to a negative electrode terminal 12 of the module MO. Corresponding to 16 batteries, 16 field effect transistors (FET) (FET1, FET2, FET3, FET4 . . . FET16) are disposed. The FET1 to FET16 perform a cell balance control.

The module MO is respectively provided with a voltage detection unit (omitted from showing in the drawing) that detects a voltage between the terminals of the battery BAT. A voltage value of the battery BAT may be detected irrespective of, for example, during charge and during discharge. The voltage value of the battery BAT may be detected at a predetermined cycle.

The voltage of each battery BAT of the battery unit 10 may be detected. During discharge, the voltage of each battery BAT is detected at a cycle of, for example, 250 milliseconds (ms). The voltage (analogue voltage data) of each battery BAT is supplied to a voltage multiplexer (MUX) 23. In this example, 16 analogue voltage data is supplied to the voltage multiplexer 13.

The voltage multiplexer 23 switches a channel, for example, at a predetermined cycle, and selects one analogue voltage data from the 16 analogue voltage data. One analogue voltage data selected by the voltage multiplexer 23 is supplied to an analogue to digital converter (ADC) 24. Then, the voltage multiplexer 23 switches the channel and supplies next analogue voltage data to the ADC 24. That is, 16 analogue voltage data are supplied from the voltage multiplexer 23 to the ADC 24 at the predetermined cycle.

Incidentally, the channel of the voltage multiplexer 23 is switched according to a control by an observation unit 40 of the module MO or by the battery management unit BMU.

A temperature measurement unit 25 detects a temperature of each battery BAT. The temperature measurement unit 25 is made of an element that detects a temperature such as a thermistor. The temperature of the battery BAT is detected at a predetermined cycle irrespective of, for example, during charge and during discharge. An analogue temperature data that shows a temperature of each battery BAT detected by the temperature measurement unit 25 is supplied to a temperature multiplexer (MUX) 26. In this example, 16 analogue temperature data corresponding respectively to the BAT1 to BAT16 are supplied to the temperature multiplexer 26.

The temperature multiplexer 26 switches a channel, for example, at a predetermined cycle, and selects one analogue temperature data from the 16 analogue temperature data. The one analogue temperature data selected by the temperature multiplexer 26 is supplied to the ADC 24. Then, the temperature multiplexer 26 switches the channel and supplies a next analogue temperature data to the ADC 24. That is, 16 analogue temperature data are supplied from the temperature multiplexer 26 to the ADC 24 at the predetermined cycle. Incidentally, the channel of the temperature multiplexer 26 is switched according to a control by the observation unit 40 of the module MO or by the battery management unit BMU.

The ADC 24 converts the analogue voltage data supplied from the voltage multiplexer 23 to digital voltage data. The ADC 24 converts the analogue voltage data to digital voltage data of, for example, 14 to 18 bits. Various methods such as a successive approximation method and a delta-sigma method can be applied to a conversion method in the ADC 24.

The ADC 24 includes, for example, an input terminal, an output terminal, a control signal input terminal in which a control signal is input, and a clock pulse input terminal in which a clock pulse is input (here, these terminals are omitted from showing in the drawings). The analogue voltage data is input to the input terminal. The digital voltage data after conversion is output from the output terminal.

The control signal (control command) supplied from, for example, the battery management unit BMU is input to the control signal input terminal. The control signal is an acquisition command signal that commands acquisition of the analogue voltage data supplied from, for example, the voltage multiplexer 23. When the acquisition command signal is input, the ADC 24 acquires the analogue voltage data, and the acquired analogue voltage data is converted to digital voltage data. Then, the digital voltage data is output through the output terminal in response to a synchronizing clock pulse input to the clock pulse input terminal. The outputted digital voltage data is supplied to the observation unit 40.

Further, the acquisition command signal that commands to acquire the analogue temperature data supplied from the temperature multiplexer 26 is input to the control signal input terminal. In response to the acquisition command signal, the ADC 24 acquires the analogue temperature data. The acquired analogue temperature data is converted to digital temperature data by the ADC24. The analogue temperature data is converted to the digital temperature data of, for example, 14 to 18 bits. The converted digital temperature data is output through the output terminal and the outputted digital temperature data is supplied to the observation unit 40.

A temperature measurement unit 27 measures a temperature of a whole module. The temperature measurement unit 27 measures a temperature in the exterior case of the module MO. Analogue temperature data measured by the temperature measurement unit 27 is supplied to the temperature multiplexer 26 and supplied to the ADC 24 from the temperature multiplexer 26. Then, the analogue temperature data is converted to digital temperature data by the ADC24. The digital temperature data is supplied to the observation unit 40 from the ADC24.

The module MO has a current detection unit that detects a value of a current (load current). The current detection unit detects current values that flow to 16 batteries BAT. The current detection unit includes a current detection resistance 28 connected to between, for example, negative electrode sides of the 16 batteries and the negative electrode terminal 12 and a current detection amplifier 29 connected to both ends of the current detection resistance 28. The current detection resistance 28 detects analogue current data. The analogue current data is detected at a predetermined cycle irrespective of, for example, during charge and during discharge.

The detected analogue current data is supplied to the current detection amplifier 29. The analogue current data is amplified by the current detection amplifier 29. A gain of the current detection amplifier 29 is set to, for example, about 50 to 100 times. The amplified analogue current data is supplied to an ADC 31.

The ADC 31 converts the analogue voltage data supplied from the current detection amplifier 29 to digital current data. The ADC 31 converts the analogue current data to the digital current data of, for example, 14 to 18 bits. Various methods such as a successive approximation method and a delta-sigma method can be applied to a conversion method in the ADC 31.

The ADC 31 includes, for example, an input terminal, an output terminal, a control signal input terminal in which a control signal is input, and a clock pulse input terminal in which a clock pulse is input (here, these terminals are omitted from showing in the drawings). The analogue current data is input to the input terminal. The digital current data is output from the output terminal.

A control signal (control command) supplied from, for example, the battery management unit BMU is input to the control signal input terminal of the ADC31. The control signal is an acquisition command signal that commands acquisition of the analogue current data supplied from, for example, the current detection amplifier 29. When the acquisition command signal is input, the ADC 31 acquires the analogue current data, and the acquired analogue current data is converted to digital current data. Then, the digital current data is output from the output terminal in response to the synchronizing clock pulse input to the clock pulse input terminal. The outputted digital current data is supplied to the observation unit 40. The digital current data is an example of current information. Incidentally, the ADC24 and the ADC31 may be configured as the same ADC.

The observation unit 40 observes the digital voltage data and the digital temperature data supplied from the ADC24 and observes whether the battery is normal or abnormal. For example, in the case where a voltage indicated by the digital voltage data is a voltage that is a measure of an overcharge (for example, in the proximity of 4.2 V etc.), or a voltage that is a measure of an overdischarge (for example, in the proximity of 2.0 V to 2.7 V etc.), an abnormality notification signal that shows that there is an abnormality or that there may be an abnormality is generated. Further, the observation unit 40 generates the abnormality notification signal in the same manner also when the temperature of the battery or the temperature of the whole module is greater than a threshold value.

Further, the observation unit 40 observes the digital current data supplied from the ADC 31. In the case where a current value indicated by the digital current data is greater than the threshold value, the observation unit 40 generates an abnormality notification signal. The abnormality notification signal generated by the observation unit 40 is transmitted to the battery management unit BMU by a communication function that the observation unit 40 has.

The observation unit 40, together with observing whether there is the abnormality described above, transmits the digital voltage data for every 16 batteries supplied from the ADC 24 and the digital current data supplied from the ADC 31 by communication to the battery management unit BMU. Further, the battery management unit BMU communicates with the line concentrator HUB and transmits the voltage data, the current data, the temperature data, etc. of each module MO to the line concentrator HUB.

The digital voltage data and the digital current data for each battery may be supplied directly to the battery management unit BMU without involving an observation circuit. The transmitted digital voltage data and digital current data for each battery are input in the battery management unit BMU. Further, the digital temperature data supplied from the ADC24 is supplied from the observation unit 40 to the battery management unit BMU.

The battery management unit BMU includes a module controller unit (MCU) and switches such as a charge switch and a discharge switch (omitted from showing in the drawing). The MCU includes a central processing unit (CPU) etc. having a communication function and controls each module MO. The battery management unit BMU notifies the line concentrator HUB of the abnormality by using the communication function when, for example, the abnormality notification signal is supplied from the observation unit 40. In response to the notification, for example, the line concentrator HUB transmits an instruction to the battery management unit BMU by communication and properly executes a control to the string ST such as charge or discharge stop.

Though omitted from showing in the drawing, the charge switch includes a switch element and a diode connected in parallel with the switch element and in a forward direction with respect to the discharge current. The discharge switch includes a switch element and a diode connected in parallel with the switch element and in a forward direction with respect to the charge current. As the switch element, for example, an insulated gate bipolar transistor (IGBT), a metal oxide semiconductor field effect transistor (MOSFET), and a relay contact can be used. Incidentally, the charge switch and the discharge switch are inserted in a positive or negative power line. Further, switches for pre-charge and pre-discharge may be provided. In the pre-charge and the pre-discharge, the charge current and the discharge current are made smaller currents. Since a small charge current can be flowed to the module MO, for example, by turning on the switch for the pre-charge, after a certain long time has passed, all modules MO or strings ST are homogeneously charged and become substantially the same voltages with each other.

A bidirectional communication according to a standard such as I2C and system management bus (SMBus), which are standards of serial communication, a serial peripheral interface (SPI), and a control area network (CAN) is performed between a communication unit of the observation unit 40 and the battery management unit BMU. The communication may be performed by a cable communication or a wireless communication.

The digital voltage data is input to the observation unit 40. For example, the digital voltage data for each battery during discharge of the module MO is input to the observation circuit. Further, a magnitude of a load current (digital current data) when the module MO is connected to the load is input to the observation circuit. The digital temperature data that indicates a temperature for each battery and the temperature in the module MO is input to the observation circuit. The observation unit 40 transmits the digital voltage data for each battery and the digital temperature data that shows a temperature for each battery, which are input in the observation circuit, the digital current data, etc. to the battery management unit BMU.

The observation circuit includes a memory unit made of a read only memory (ROM) and a random access memory (RAM). In the memory unit, for example, a program that is executed by the observation circuit is housed. The memory unit is further used as a work area for executing the processing of the observation circuit. In the memory unit, further, a history of charge and discharge (appropriately called as a charge/discharge history) is stored. The charge/discharge history includes information of charge condition such as a charge rate and a charge time, and the number of the charges, discharge condition such as a discharge rate and a discharge time, the number of the discharges, and the temperatures of the battery when the charge or the discharge is performed.

A band gap reference (BGR) 32 is a conversion processing in the ADC24 and the ADC31 and generates a reference voltage for determining logical 1 or 0. The power may be supplied from the battery BAT to the BGR32 or the power may be supplied from the external power source to the BGR32.

A regulator (REG) 33 is connected to a line between the positive electrode side of the battery BAT1 and the positive electrode terminal 11. The regulator 33 is, for example, a series regulator. The regulator 33 steps down a voltage output from the battery BAT1 etc. and generates a voltage that drives each unit of the module MO. The regulator 33 generates, for example, a voltage that is supplied to the BGR32 described above and a voltage that drives a control unit when the control unit such as a microcomputer is disposed in the module MO. The regulator 33 generates a voltage of, for example, 3.3 to 5.0 V.

A switch 34 is disposed to make it possible to switch a voltage supplied from the regulator 33 and a voltage supplied from a common power line for controller. As shown in FIG. 1, according to an embodiment of the present technology, a common power line $L_{pw2}$ is disposed to supply power to the battery management unit BMU, the line concentrator HUB, the system controller SYS etc. A voltage of the common power for the controller is set to, for example, 5 V to 50 V. Thus, for example, also in the separated string ST, a control power source can be supplied. When a common power source is used for a communication circuit and a control circuit, transmission/reception can be performed without ceasing data supply in the communication performed by the system controller SYS etc. Further, information of the observation unit 40 of the module MO of the string ST of which operation is stopped, information of the battery management unit BMU, and information of the module MO can be gathered, and abnormality observation can be performed also of the string ST in a rest condition. Further, there is no need of a new step-down circuit also in the control circuit of the line concentrator HUB.

A power shut-down switch 35 is connected to a line between the positive electrode side of the battery BAT1 and the positive electrode terminal 11. The power shut-down switch 35 is usually turned on and turned off when a fundamental abnormality occurred in the module MO. For example, in the case where communication between the observation unit 40 and the battery management unit BMU becomes not possible, or in the case where data transmission between the ADC24 and the observation unit 40 becomes not possible, the power shut-down switch 35 is turned off and a circuit of the module MO is blocked. An on/off control of the power shut-down switch 35 is performed by, for example, the battery management unit BMU.

(Line Concentrator (BMU hub))

Returning to FIG. 1, the battery management unit BMU and the line concentrator HUB are connected with each other through a communication line $L_{com}$. Further, a plurality of the battery management units BMU are connected with each other through a communication line $L_{com}$. As the communication line $L_{com}$, CAN, RS232C, RS485 etc. are used. Incidentally, the plurality of the battery management units BMU may be connected in parallel. The line concentrator HUB can typically aggregate, for example, maximum 64 parallel battery management units BMU.

The line concentrator HUB communicates with the battery management unit BMU and observes a state of the plurality of the strings ST (a plurality of the modules MO). Further, the line concentrator HUB notifies the system controller SYS and the power conditioning system INV of a state of the plurality of the strings ST (the plurality of modules MO). Further, the line concentrator HUB receives instructions from the system controller SYS and the power conditioning system INV by communication, gives an instruction to the battery management unit BMU by communication, and controls the battery management unit BMU. Incidentally, the line concentrator HUB is provided with a control function, and the line concentrator HUB may perform observation and control of the plurality of the strings ST (the plurality of the modules MO).

In the line concentrator HUB, for example, connection information such as the number of series connection of the strings ST, the number of parallel connections, the number of total connections of the strings ST, the numbers of series connections and/or the parallel connections of the modules MO of each string, and the number of connections of the modules MO etc. in the electric storage system are held. The connection information is set, for example, by an operation by a user to a user interface (UI) (omitted from showing in the drawing) of the line concentrator HUB, transmission of connection information from the system controller SYS to the line concentrator HUB, etc.

Module information regarding present voltage, current, temperature, etc. of each module MO may be held in the line concentrator HUB. The module information is acquired, for example, when the line concentrator HUB communicates with the battery management unit BMU.

Further, connection/un-connection setting information that shows connection or unconnection for each battery management unit BMU is held in the line concentrator HUB. The connection/un-connection setting information for each battery management unit BMU is determined when, for example, the line concentrator HUB communicates with each battery management unit BMU. For example, the line concentrator HUB acquires identification information (for example, version name of a protocol, ID number, destination information (for example, EU, Japanese domestic, Asia, etc.)), and determines, when there is a response, that the battery management unit BMU is connected to the line concentrator HUB.

The line concentrator HUB communicates with, for example, the battery management unit BMU at a predetermined interval or at random intervals, and determines that the battery management unit BMU is connected to the line concentrator HUB when the same data (identification data) can be obtained two times consecutively from the same battery management unit BMU. In the case where the data acquired by the second communication is different from the data acquired at the first communication or the response is not obtained from the battery management unit BMU, the communication is performed once more. As a result, in the case where the response is not obtained from the battery management unit BMU or the data acquired by the second communication is different from the data acquired at the first communication, the communication is performed once more. In the case where, by repeating the above, the same data (identification data) is acquired two times consecutively from the same battery management unit BMU, the battery management unit BMU is determined to be connected. Incidentally, in the case where the same data (identification data) is acquired a plurality of times (for example, three times etc.) consecutively from the same battery management unit BMU, the battery management unit BMU may be determined to be connected.

(Operation of Electric Storage System)

Hereinafter, an operation of the electric storage device described above will be described.

(Initialization Processing of Line Concentrator HUB)

An initialization processing of the line concentrator HUB in the electric storage system will be described with reference to FIG. 3. The electric storage system includes a power conditioning system INV, a line concentrator HUB, a battery management unit BMU, and a plurality of strings ST (a plurality of modules, omitted from showing in the drawing).

When an operator turns on a power source of the battery management unit BMU in a step S11, the battery management unit BMU is started-up in a step S12, and the initialization processing of the battery management unit BMU is started. At this time, the battery management unit BMU controls such that pre-charge and pre-discharge to the module MO is in a state of ON, and charge and discharge to the module MO is in a state of OFF.

When the operator turns on a power source of the line concentrator HUB in a step S13, the line concentrator HUB is started-up in a step S14, and the initialization processing is started. In a step S15, the operator sets the number of series and parallel connections to the line concentrator HUB. In a step S16, the operator sets the number of connected strings to the line concentrator HUB.

In a step S17, the line concentrator HUB communicates with the battery management unit BMU and acquires identification information of the battery management unit BMU. At this time, as described above, in the case where the line concentrator HUB communicates with, for example, the battery management unit BMU and can acquire the same data (identification information) two times consecutively from the same battery management unit BMU, the battery management unit BMU may be determined to be in a state connected to the line concentrator HUB.

In steps S18 and S19, the line concentrator HUB communicates with the battery management unit BMU and confirms whether the initialization has completed. In steps S20 and S21, the line concentrator HUB communicates with the battery management unit BMU and acquires a voltage value of each string ST.

In a step S22, the line concentrator HUB confirms a voltage of each string ST and determines whether charge and discharge may be permitted to the battery management unit BMU. In a step S23, in the case where it is determined that the charge and discharge of the battery management unit BMU may be permitted, the line concentrator HUB performs a command of the charge and discharge permission to the battery management unit BMU by communication. In a step S24, the battery management unit BMU controls such that pre-charge and pre-discharge to the module MO may be an OFF-state and charge and discharge to the module MO may be an ON-state.

In a step S25, the line concentrator HUB calculates a chargeable/dischargeable current in the electric storage system based on the result of communication. For example, if a charge of 50 A is possible for one string, a chargeable current value can be acquired as 50 A times 2=100 A.

In a step S26, when the initialization of the line concentrator HUB has come to completion, in a step S27, the power conditioning system INV communicates with the line concentrator HUB and confirms that the initialization of the line concentrator HUB has come to completion. In a step S28, the power conditioning system INV communicates with the line concentrator HUB, acquires chargeable/dischargeable current values, and sets a current value that is flowed to the string ST based on the acquired current value.

(Detail of One Example of Charge/Discharge Permission Control)

An example of charge and discharge permission control will be described. In the case where a voltage difference between the battery management units BMU (strings ST) is small, it is determined that the charge and discharge of each string ST may be permitted. When this is not performed, the electric storage system becomes an unstable state such that an excessive current flows from a string ST having a high voltage to a string ST having a low voltage to be an overcurrent, and a dangerous state of the battery results.

According to an embodiment of the present technology, the line concentrator HUB acquires a voltage value of each string ST from the battery management unit BMU by communication and permits the charge/discharge when the voltage difference between the strings ST is within a definite value.

FIG. 4 is a flow chart that shows an example of a control of the charge and discharge permission. Here, an example of two of a string A and a string B will be described. Incidentally, the number of the strings may be three or more.

In a step S31, the line concentrator HUB communicates with the battery management unit BMU and starts a confirmation of a connection state between the battery management unit BMU and the line concentrator HUB. In a step S32, in the case where both of the string A and the string B are not connected, the string A and the string B are controlled to charge prohibition and discharge prohibition.

In a step S33, when only the string A is confirmed d to be in a connected state, in a step S34, only the string A is controlled to the charge permission and discharge permission. In a step S35, when only the string B is confirmed d to be in a connected state, in a step S36, only the string B is controlled to the charge permission and discharge permission.

In a step S37, when both of the string A and the string B are confirmed to be in a connected state, in a step S38, whether a voltage difference between a voltage of the string A and a voltage of the string B is within a definite value range (for example, 2 V or less) is determined.

In the case where the voltage difference is out of the definite value range, the processing proceeds to a step S41 described below. In the case where the voltage difference is within the definite value range, in a step S39, both of the string A and the string B are controlled to the charge permission and the discharge permission. In the case where, in a step S40, whether the voltage difference between the voltage of the string A and the voltage of the string B is within a definite value range (for example, 2 V or less) is determined during charge/discharge and the voltage difference is out of the definite value range, the proceeding proceeds to the step S41.

In the step S41, whether which of the voltage of the string A and the voltage of the string B is greater is determined. In the case where the voltage of the string A is greater than the voltage of the string B, in a step S42, the charge and the discharge of the string A are permitted, and the charge and the discharge of the string B are prohibited. The processing proceeds to a step S43 and whether the voltage difference between the voltage of the string A and the voltage of the string B is within a definite value range (for example, 2 V or less) is determined. In the case where the voltage difference between the voltage of the string A and the voltage of the string B is within a definite value range, in the step S39, both of the string A and the string B are controlled to the charge permission and the discharge permission.

In the case where the voltage of the string A is smaller than the voltage of the string B, in a step S44, the charge and the discharge of the string B are permitted, and the charge and the discharge of the string A are prohibited. The processing proceeds to a step S45, whether the voltage difference between the voltage of the string A and the voltage of the string B is within a definite value range (for example, 2 V or less) is determined. In the case where the voltage difference between the voltage of the string A and the voltage of the string B is within a definite value range, in the step S39, both of the string A and the string B are controlled to the charge permission and the discharge permission.

(Charge and Discharge Control in the Case where the Number of Connected Strings Varies)

An example of a control of the charge and discharge permission in the case where the number of the connected strings varies will be described with reference to FIG. 5. Hereinafter, a case where a string N is additionally connected to the string A is considered. When the string N is additionally connected, in a step S52, to a non-connected state of the string N of a step S51, in a step S53, a voltage difference of the string A and string N is checked. In the step S53, the string A is controlled to the discharge permission and the charge permission, and the string N is controlled to discharge prohibition and charge prohibition.

In the case where the voltage difference of the string A and the string N is within a definite value range (for example, 2 V or smaller etc.), the processing proceeds to a step S56, the string N is controlled to the discharge permission and charge permission. In the case where the voltage difference between the voltage of the string A and the voltage of the string N is out a definite value range (for example, exceeding 2 V etc.) and the voltage of the string N is lower than the voltage of the string A, firstly, the string N is controlled to the discharge prohibition and the charge prohibition, after that, in a state where the voltage difference between the voltage of the string A and the voltage of the string N becomes within 2 V, the processing proceeds to a step S56, the string N is controlled to the discharge permission and the charge permission.

In the case where the voltage difference is out of the definite value range (for example, exceeding 2 V etc.) and the voltage of the string N is higher than the voltage of the string A, in a step S54, the switches are switched in an order of the following step 1 to step 4.

Step 1: string A charge switch: ON, discharge switch: ON
String N charge switch: OFF, discharge switch: OFF
Step 2: string A charge switch: OFF, discharge switch: ON
String N charge switch: OFF, discharge switch: OFF Step 3: string A charge switch: OFF, discharge switch: ON
string N charge switch: ON, discharge switch: ON Step 4: string A charge switch: OFF, discharge switch: OFF
string N charge switch: ON, discharge switch: ON In a step S55, the string A is controlled to the discharge prohibition and the charge prohibition, and the string N is controlled to the discharge permission and the charge permission. In a state where the voltage difference of the string A and the string N becomes within a definite value range (for example, 2 V or less, etc.), the processing proceeds to a step S56, the string A is controlled to the discharge permission and the charge permission and the string N is controlled to the discharge permission and the charge permission.

(Current Control Method by Line Concentrator HUB (First Example))

According to the electric storage system of an embodiment of the present technology, a current that flows to the string ST may be controlled as shown below. A first example of the current control method according to the line concentrator HUB will be described. Hereinafter, an example where three strings ST are connected to the line concentrator HUB is considered. FIG. 6A and FIG. 6B each is a schematic diagram that shows an outline of the current control method according to the line concentrator HUB. During a usual operation, the line concentrator HUB acquires a reference current, a battery voltage and temperature data of each string ST from the battery management unit BMU by communication.

For example, the line concentrator HUB communicates with the battery management unit BMU, observes the voltage of each string ST, and, in the case of the usual operation, a current value to the line concentrator HUB is set at a recommended value based on the reference current. In an example shown in FIG. 6A, for example, the reference current of each string ST is a recommended value of charge current (rated value) 24 A to the module MO, and 24 A times the number of the strings connected to line concentrator HUB (24 A times 3=72 A) is set as the recommended value of the charge current to the line concentrator HUB.

In the case other than the usual operation such as a charge end stage etc., the current value is set based on the reference currents acquired from all strings ST with reference to a voltage and temperature table. For example, the line concentrator HUB communicates with the battery management unit BMU, observes the voltage and the temperature data of each string ST, and the line concentrator HUB sets a current value. For example, in an example shown in FIG. 6B, a control is performed such that a current value of one half of the recommended value of the charge current times the number of the strings ST connected to the line concentrator HUB (12 A times 3=36 A) is set as a charge current value to the line concentrator HUB.

In the case where there are differences of current values for every strings ST during the charge/discharge, when the current value of each string ST is controlled by fitting to the least current value, a sharp voltage increase at the charge end stage and a sharp voltage drop at the discharge end stage can be suppressed, and the overdischarge/overcharge of the module MO can be prevented. In particular, since it can be prevented that only a specific string ST is over-charged/over-discharged and, as a result, the system as a whole is stopped, a stable operation can be performed.

In the case of the usual operation, the current value to the line concentrator HUB is set at a recommended value based on the reference current. In an example shown in FIG. 7A, for example, the reference current of each string ST is a recommended value of the charge current (rated value) 24 A, 24 A times the number of the strings connected to the line concentrator HUB (24 A times 3=72 A) is set as the charge current value to the line concentrator HUB.

In the charge end stage, based on the reference currents acquired from all strings ST, with reference to the least recommended value of the charge current, the current value to the line concentrator HUB is set. In an example shown in FIG. 7B, for example, a recommended value of the charge currents of two strings ST is 24 A, and the recommended value of the charge current of one string ST is 6 A. The least recommended value of the charge current 6 A times the number of the strings ST connected to the line concentrator HUB (6 A times 3=18 A) is set as the charge current value to the line concentrator HUB.

(Charge/Discharge Control)

According to an electric storage system of an embodiment of the present technology, the voltage and temperature of each string ST are observed, and the charge/discharge controls of each string ST in response to each change of the voltage and temperature are performed.

As shown in FIG. 8, after the start of the initialization of the line concentrator HUB (step S61), power source check (step S62), IC start-up (step S63), IC operation confirmation (step S64), communication confirmation (step S65), identification information confirmation (step S66), and module data collection (step S67) are performed. Thereafter, the line concentrator HUB receives an instruction from the system controller SYS (step S68, step S69), and the charge and discharge control described below is performed.

Incidentally, in the case where the IC start-up (step S63) is not confirmed, the processing returns to the step S62, and the power source check is performed again. In the case where the communication is not confirmed, the processing returns to the step S65, and the communication confirmation is performed again. In the case where the line concentrator HUB performs communication, and can neither confirm BMU identification information nor collect the module data, the processing returns to the step S66, and the BMU identification information is confirmed again. In the case where these confirmation operations result in NG five times, the processing proceeds to a step S70, and the initialization processing is stopped.

(Charge/discharge Control by Voltage Observation)

With referring to FIG. 9, the charge/discharge control of the electric storage system by the voltage observation will be described. In a step S81, upon receiving an instruction from the system controller SYS, in the line concentrator HUB, the charge/discharge control is started to the string ST in which identification information of the battery management unit BMU set in the line concentrator HUB and the identification information of the battery management unit BMU match.

In a step S82, the line concentrator HUB confirms whether the voltage of the module MO (string ST) is within a definite value range by communicating with each battery management unit BMU of each string ST connected to the line concentrator HUB. In the step S82, in the case where the module voltage is out of the predetermined range, the processing proceeds to a step S94, and the charge/discharge control is stopped temporarily.

In the case where the voltage of each string ST is within a definite value range, in a step S83, the line concentrator HUB communicates with the battery management unit BMU and acquires an output quantity (or input quantity) of the power of each string ST connected to the line concentrator HUB. Then, a total output quantity (or input quantity) of all strings ST connected to the line concentrator HUB is calculated, and whether a power quantity (power value) necessary for the exterior such as the load is within the range of the total output quantity (or input quantity) is confirmed.

Next, in a step S84, the power quantity of each string ST corresponding to the power quantity necessary for an exterior 1 such as the load is assigned. The line concentrator HUB communicates with the battery management unit BMU, acquires chargeable/dischargeable currents of each string and sets a current value that is flowed to the electric storage system to the line concentrator HUB. The current value that flows to each string ST is set at, for example, a current value smaller than the rated current of the module MO (step S85).

In the case where the series number and parallel number (connection state) of the modules MO of each string ST set in the line concentrator HUB are confirmed and the series number and parallel number (connection state) of the modules MO of each string ST set in the line concentrator HUB are different from the series number and parallel number of the modules MO of each string ST detected from the voltage etc., the processing proceeds to a step S101. In the step S101, an alarm of string connection abnormality is notified. Then, in a step S94, the charge/discharge control of the string that is confirmed to be in connection abnormality is stopped temporarily.

Next, in a step S86, the line concentrator HUB instructs permission of charge and discharge to each battery management unit BMU by communication, and turns ON a switch (FET etc.) of the charge and discharge of each battery management unit BMU, and each string ST starts the charge and discharge.

In the case where the battery management unit BMU and/or the module MO generated abnormality during module charge and discharge of the step S87, in a step S102, the device is determined to be abnormal, and the processing proceeds to the step S94. In the step S94, the line concentrator HUB instructs the battery management unit BMU to stop the charge and discharge by communication and turns OFF a switch of charge and discharge of the string ST in which device abnormality occurred.

After the charge and discharge of the module MO is started, in a step S88, the line concentrator HUB communicates with each battery management unit BMU and observes a state of each string ST (here, voltage). Whether each module voltage of each string ST is within the predetermined range and whether connection setting of the battery management unit BMU recorded by the line concentrator HUB and a connection state of each string actually detected are different are determined. In the case where the present connection mode detected by the line concentrator HUB is different from a setting state recorded in the line concentrator HUB, in a step S103, an alarm of BMU setting abnormality is issued. Incidentally, at this time, without stopping the charge and discharge of the alarmed string ST, the charge and discharge of the string is continued (step S89).

During the charge and discharge of each string ST (step S89), whether the voltage fluctuates between the strings ST is observed. In the case where the voltage fluctuates between the strings ST, an alarm that a power difference has occurred in the string ST is issued.

In a step S90, the line concentrator HUB communicates with each battery management unit BMU and observes whether the voltage of each string ST has reached a predetermined voltage (a voltage ($V_{max}$−a) lower by a predetermined voltage than an upper limit voltage, or a voltage ($V_{min}$+a) higher by a predetermined voltage than a lower limit voltage).

In a step S91, the line concentrator HUB communicates with each battery management unit BMU and instructs a change in a current value to reduce a power value of the string that has reached the predetermined voltage to one half or one fourth of a rated current value I. The battery management unit BMU that has received the command from the line concentrator HUB controls such that a current value that is flowed to the string ST is changed. Incidentally, the change of the current value may be performed by the control shown in FIG. 6B described above. That is, for example, in the case where there are three strings ST, a current value calculated by one half or one fourth of the rated current value times the number of the connected strings is set as a current value to the line concentrator HUB.

In a step S92, when the string ST is confirmed to have reached the lower limit voltage, the upper limit voltage, the line concentrator HUB instructs the battery management unit BMU to stop charge and discharge by communication, and turns OFF a switch of charge and discharge of the string ST that has reached the lower limit voltage ($V_{min}$), upper limit voltage ($V_{max}$) (step S93).

Incidentally, at this time, in the case where, for example, the number of connected strings changes by separating the string ST that has reached the predetermined voltage, the current value set to the line concentrator HUB is recalculated and set. That is, in the case where, for example, one of three strings ST is separated, a current value calculated by one half or one fourth of the rated current value times the number of remained connected strings (3−1=2) is set as a current value to the line concentrator HUB. The charge/discharge control according to the voltage observation described above is performed in the electric storage system according to an embodiment of the present technology.

(Charge/discharge Control by Temperature Observation)

With referring to FIG. 10, the charge/discharge control by the temperature observation will be described. In a step S111, upon receiving an instruction from the system controller SYS, in the line concentrator HUB, the charge/discharge control is started to the string ST in which identification information of the battery management unit BMU set in the line concentrator HUB and the identification information of the battery management unit BMU match.

In a step S112, the line concentrator HUB confirms whether the temperature of the module MO (string ST) is within a definite value range by communicating with each battery management unit BMU of each string ST connected to the line concentrator HUB. In the step S112, in the case where the temperature of the module MO is out of the definite value range, the processing proceeds to a step S124, and the charge/discharge control is stopped temporarily.

In the case where the temperature of each string ST is within a definite value range, in a step S113, the line concentrator HUB communicates with the battery management unit BMU and acquires an output quantity (or input quantity) of the power of each string ST connected to the line concentrator HUB. Then, a total output quantity (or input quantity) of all strings ST connected to the line concentrator HUB is calculated, and whether a power quantity (power value) necessary for the exterior such as the load is within the range of the total output quantity (or input quantity) is confirmed.

Next, in a step S114, the power quantity of each string corresponding to the power quantity necessary for an exterior such as the load is assigned. The line concentrator HUB communicates with the battery management unit BMU, acquires chargeable/dischargeable currents of each string and sets a current value that is flowed to the electric storage system to the line concentrator HUB. The current value that flows to each string is set at, for example, a current value smaller than the rated current of the module (step S115).

In the case where the series number and parallel number (connection state) of the modules MO of each string ST set in the line concentrator HUB are confirmed and the series number and parallel number (connection state) of the modules MO of each string ST set in the line concentrator HUB are different from the series number and parallel number of the modules MO of each string ST detected from the voltage etc., the processing proceeds to a step S131. In the step S131, an alarm of string connection abnormality is notified. Then, in a step S124, the charge/discharge control of the string that is confirmed to be in connection abnormality is stopped temporarily.

Next, in a step S116, the line concentrator HUB instructs permission of charge and discharge to each battery management unit BMU by communication, and turns ON a switch (FET etc.) of the charge and discharge of each battery management unit BMU, and each string ST starts the charge and discharge.

At this time, in the case where the battery management unit BMU and/or the module MO generated abnormality, in a step S132, the device is determined to be abnormal, and the processing proceeds to the step S124. In the step S124, the line concentrator HUB instructs the battery management unit BMU to stop the charge and discharge by communication and turns OFF a switch of charge and discharge of the string ST in which device abnormality occurred.

After the charge and discharge of the module MO is started, in a step S118, the line concentrator HUB communicates with each battery management unit BMU and observes a state of each string ST (here, temperature). Whether the temperature of each string is within the definite value range is determined.

During the charge and discharge of each string (step S119), whether the voltage fluctuates between the strings is observed. In the case where the voltage fluctuates between the strings, in a step S133, an alarm that a power difference has occurred in the string ST is issued.

In a step S120, the line concentrator HUB communicates with each battery management unit BMU and observes whether the temperature of each string ST has reached a predetermined temperature (a temperature ($T_{max}$-a) lower by a predetermined temperature than an upper limit temperature, or a temperature ($T_{min}$+a) higher by a predetermined temperature than a lower limit temperature).

In a step S121, the line concentrator HUB communicates with each battery management unit BMU and instructs a change in a current value to reduce a current value of the string ST that has reached the predetermined temperature to one half or one fourth of a rated current value I. The battery management unit BMU that has received the command from the line concentrator HUB controls such that a current value that is flowed to the string ST is changed. Incidentally, the change of the current value may be performed by the control shown in FIG. 6B described above. That is, for example, in the case where there are three strings ST, a current value calculated by one half or one fourth of the rated current value times the number of the connected strings is set as a current value to the line concentrator HUB.

In a step S122, when the string ST is confirmed to have reached the lower limit temperature, the upper limit temperature, the line concentrator HUB instructs the battery management unit BMU to stop charge and discharge by communication, and turns OFF a switch of charge and discharge of the string ST that has reached the lower limit temperature ($T_{min}$), upper limit temperature ($T_{max}$) (step S123). Incidentally, at this time, in the case where the number of connected strings changes by separating the string ST that has reached the predetermined temperature, the current value set to the line concentrator HUB is recalculated and set. That is, in the case where, for example, one of three strings ST is separated, a current value calculated by one half or one fourth of the rated current value times the number of remained connected strings (3−1=2) is set as a current value to the line concentrator HUB. The charge/discharge control according to the temperature observation described above is performed in the electric storage system according to an embodiment of the present technology.

In the charge/discharge control according to the above-described temperature observation, as one example, charge prohibition at −10 degrees Celsius or lower, limitation of the charge current value from exceeding −10 degrees Celsius to 0 degrees Celsius or lower (for example, 1/4C current or lower), limitation of the charge current value from exceeding 0 degrees Celsius to 10 degrees Celsius or lower (for example, 1/2C current or lower), the rated current value from exceeding 10 degrees Celsius to 60 degrees Celsius or lower (for example, rated 1C current), and charge prohibition at exceeding 60 degrees Celsius are performed. For example, limitation of the discharge current value at 60 degrees Celsius or lower (for example, rated 1C current or lower), limitation of the discharge current value from exceeding 60 degrees Celsius to 80 degrees Celsius or lower (for example, rated 1/2C current or lower), and discharge prohibition at exceeding 80 degrees Celsius are performed.

"One Example of Secondary Battery" In an embodiment of the present technology, an example of a secondary battery that is used is a lithium ion secondary battery that includes a positive electrode active material and a carbon material such as graphite as a negative electrode active material, and the positive electrode active material having an olivine structure is contained as a positive electrode material.

As the positive electrode active material having the olivine structure, lithium iron phosphate ($LiFePO_4$), or lithium iron composite phosphate containing a different kind of atom ($LiFe_xM_{1-x}O_4$: M represents one or more kinds of metals, x is 0<x<1.) is preferred. Here, "mainly" means that a total amount of the positive electrode active material of a positive electrode active material layer is 50% or more. Further, when M includes two or more kinds, a total amount of the respective subscript numbers is selected to be 1−x.

As the M, transition elements, IIA group elements, IIIA group elements, IIIB group elements, IVB group elements, etc., can be cited. In particular, at least one kind of cobalt (Co), nickel, manganese (Mn), iron, aluminum, vanadium (V) and titanium (Ti) is preferably contained.

The positive electrode active material may be provided with a coating layer containing metal oxide (for example, one selected from Ni, Mn, Li, etc.) having a composition different from the relevant oxide or phosphate (for example, lithium phosphate, etc.), etc. on a surface of the lithium iron phosphate or the lithium iron composite phosphate.

As the positive electrode material that can absorb and release lithium (Li), lithium composite oxides such as lithium cobalt oxide ($LiCoO_2$), lithium nickel oxide ($LiNiO_2$), and lithium manganese oxide ($LiMnO_2$), which has a layered rock salt structure, and lithium manganese oxide ($LiMn_2O_4$) that has a spinel structure may be used.

As the graphite in the present technology, without particular limitation, graphite materials used in the business field can be broadly used. As the material of the negative electrode, lithium titanate, silicon (Si)-based materials, tin (Sn)-based materials, etc. may be used.

As a manufacturing method of a battery electrode according to the present technology, methods used in the business field can be broadly used without particular limitation.

As a battery configuration in the present technology, well-known configurations can be broadly used without particular limitation.

As an electrolytic solution used in the present technology, the electrolytic solutions used in the business field including liquid electrolyte and gel-like electrolyte can be broadly used without particular limitation.

An example of discharge characteristics of a module MO that uses a secondary battery that includes a positive electrode active material having an olivine structure as a positive electrode material is shown in FIG. 11.

As described above, in the electric storage system according to an embodiment of the present technology, the line concentrator HUB communicates with each battery management unit BMU and observes whether the voltage of each string ST has reached the predetermined voltage (a voltage ($V_{max}$–a) lower by a predetermined voltage than an upper limit voltage, or a voltage ($V_{min}$+a) higher by a predetermined voltage than a lower limit voltage). In order to reduce the power value of the string that has reached the predetermined voltage to one half or one fourth of the rated current value I, the line concentrator HUB communicates with each battery management unit BMU and instructs a change in the current value. The battery management unit BMU that has received the command from the line concentrator HUB controls such that a current value that is flowed to the string ST is changed. Thus, for example, in FIG. 11, in a charge current limiting region R1 and a discharge current limiting region R2, the current value is limited (for example, from 1 CA to 0.5 CA or lower).

According to an embodiment of the present technology, when reaching a voltage value short of the charge upper limit voltage value/discharge lower limit voltage value (for example, a voltage value short by approximately 0.1 V), the line concentrator HUB instructs current restriction to the battery management unit BMU and an upper system, notices beforehand the completion of charge/discharge by reducing to one half or one fourth from a usual current value, and stops the charge/discharge when a charge/discharge setting voltage value has been reached. By instructing a reduction in current, sudden stop due to a prior notice can be prevented, both a storage battery and an external system can secure a stable operation, and almost all amount of a capacity of the storage battery can be used. In particular, in a lithium ion secondary battery with $LiFePO_4$ as a positive electrode and with lead as a negative electrode, on a charge side, when a cell voltage becomes 3.5 V or higher, a cell charge capacity is 1 to few percent even by a sharp voltage change, on the other hand, on a discharge side, when a cell voltage becomes 2.8 V or lower, a cell discharge capacity is 1 to few percent even by a sharp voltage change. Therefore, by making the charge/discharge continue while reducing a setting current value at a predetermined voltage short of the charge upper limit voltage/discharge end voltage, a prior notice of end/stop up to the upper/lower limit voltage can be performed, and by noticing a rapid stop due to a rapid voltage change, the external system can be suppressed from a situation of sudden stop, and a more stable power source system can be operated.

(Background Technology)

Patent literature 1 (US 2013/0249475A) discloses a multiple connection method of strings and a switching management method of a load output. Both of these relates to an operation method of a string structure in which a plurality of storage battery units are connected. This discloses a method of performing switching control of each storage battery unit from a controller. Different from the present technology, power sources that supply power to a control/controller unit are not configured of the same circuit.

Patent literature 2 (JP 2010-45923A) discloses an electric storage system that includes a master unit controller and a slave unit controller in a hierarchical structure and performs a communication of a control signal of a storage battery. In this electric storage system, when a failure occurred to the master unit controller, control malfunction of the storage battery due to the slave unit controller is avoided. However, what is described in Patent literature 2 is a connection circuit switching method that, when a failure occurred to the master unit controller, the slave unit controller switches a connection to a different master unit controller and makes charge/discharge of each module continue. That is, different from the present technology, the patent literature 2 does not disclose an operation of pause/stop during occurrence of malfunction.

Patent literature 3 (JP 2010-45923 A) describes a control method for performing equalization without stopping an operation of all strings when one string becomes necessary to be equalized in a set battery configured by connecting a plurality of electric cells in parallel.

According to the electric storage system of an embodiment of the present technology described above, by communicating, aggregating and holding identification information such as ID numbers and data of each module, during communication between a plurality of modules and the line concentrator HUB, an operation state of a module, a dispersion state of a current, a difference up to charge state/discharge end, and a difference of upper/lower limit temperatures can be confirmed. During string connection switching in which a time prediction up to the upper/lower limit temperatures in a temperature variation can be performed, a sharp up/low variation of a current can be predicted, and an operation suppressed within a use range becomes possible. A stable operation can be secured, further, almost total amount of a capacity of the storage battery can be used.

In the electric storage system according to an embodiment of the present technology, when the communication with each controller is stopped, the communication is tried again, and, in the case where the communication is unable to be recovered, only when each string ST of which communication is possible is at the rated current value or lower, the charge/discharge is permitted by the system controller SYS.

The string ST of which communication is stopped is prohibited to charge/discharge, and a connection is permitted in the case where a voltage difference of a voltage of the string ST after recovery of the communication with respect to a voltage of other string ST becomes in the predetermined range. The system controller SYS permits a charge/discharge connection at the string ST only when the identification information set in the line concentrator HUB and the identification information of the battery management unit BMU match, and firstly, operates a voltage equalization circuit between the strings. The charge/discharge connection is not permitted to the string of which identification information set in the line concentrator HUB does not match with the identification information of the battery management unit BMU.

When a storage battery system is operated in a state where the identification information set in the line concentrator HUB and the identification information of the battery management unit BMU are unable to be recognized, the charge/discharge is performed in a state where a state of each storage battery module is unable to be grasped, when an operation is performed in a state where whether the charge/discharge of a normal cell is performed is not known, an overrun of the storage battery is invited, and a fundamental state of a system operation is damaged. Therefore, the storage battery system that is operated is necessary to be able to grasp the identification information of the battery management unit BMU and the identification information set in the line concentrator HUB.

At this time, when a plurality of the strings ST are operated in parallel by connecting/paralleling off and when power is supplied to a control substrate/communication substrate in a direct current high-voltage of 400 V to 900 V as it is, since a voltage variation is large, it is difficult to step-down to a definite voltage. According to an embodiment of the present technology, when common power of 50 V to 100 V is supplied to the control substrate/communication substrate, an adjustment of the voltage is easy and the power/voltage of each storage battery module can be used, an influence of noise from an AC conversion power converter can be made smaller, a power supply stop due to an instantaneous power backflow accompanying during connecting/paralleling off between the strings can be suppressed, thus, a stable power supply source can be formed.

In the case where the voltages that can vary amounts of input/output power while adjusting the amount of charge and discharge power and the number of connections of the strings in accordance with external load power are the same, the current can be evenly dispersed. In the case of different voltages, a current load amount can be varied while separating a lower limit potential module during discharge.

<4. Application Example>

"Power storage device in house as application example"
An example in which an embodiment of the present technology is applied to a power storage device for houses will be described with reference to FIG. 12. For example, in a power storage device 100 for a house 101, power is supplied to an electric storage device 103 from a centralized power system 102 such as thermal power 102a, nuclear power 102b, and hydraulic power 102c through a power network 109, an information network 112, a smart meter 107, a power hub 108, etc. Together with this, power is supplied to the electric storage device 103 from an independent power source such as a domestic power generation device 104. The power supplied to the electric storage device 103 is stored. The power used in the house 101 is supplied using the electric storage device 103. The same power storage device can be used not only in the house 101 but also in buildings. The electric storage device 103 is formed by connecting a plurality of modules in parallel as described above.

The house 101 is provided with the domestic power generation device 104, a power consumption device 105, the electric storage device 103, a control device 110 controlling each device, the smart meter 107, and sensors 111 acquiring various kinds of information. The devices are connected through the power network 109 and the information network 112. A solar cell, a fuel cell, etc. are used as the domestic power generation device 104, and generated power is supplied to the power consumption device 105 and/or the electric storage device 103. The power consumption device 105 is a refrigerator 105a, an air conditioner 105b, a television receiver 105c, a bath 105d, etc. Moreover, the power consumption device 105 includes an electric vehicle 106. The electric vehicle 106 is an electric car 106a, a hybrid car 106b, and an electric motorcycle 106c.

The electric storage device 103 is constituted by secondary batteries or a capacitor. For example, the electric storage device 103 is constituted by lithium ion secondary batteries. The plurality of modules described above can be applied to the electric storage device 103. The lithium ion secondary battery may be a stationary type or may be one used in the electric vehicle 106. The smart meter 107 has a function of measuring a use amount of commercial power and transmitting the measured use amount to an electric power company. The power network 109 may be of one of DC power supply, AC power supply, and noncontact power supply or of the combination of a plurality of them.

The various sensors 111 are a human sensor, an illumination sensor, an object detection sensor, a power consumption sensor, a vibration sensor, a contact sensor, a temperature sensor, an infrared sensor, etc., for example. The information acquired by the various sensors 111 is transmitted to the control device 110. Weather conditions, human conditions, etc. are grasped based on the information from the sensors 111, and it is possible to automatically control the electric consumption device 105 so that energy consumption is minimum. Moreover, the control device 110 can transmit information about the house 101 to an external electric power company, etc. through an internet.

The power hub 108 performs processing of branch of a power line, DC-AC conversion, etc. As a communication system of the information network 112 connected to the control device 110, there are a method of using a communication interface such as a UART (Universal Asynchronous Receiver-Transmitter: transmission and reception circuit for asynchronous serial communication) and a method of using a sensor network by a wireless communication standard such as Bluetooth (registered trademark), ZigBee (registered trademark), and Wi-Fi (registered trademark). The Bluetooth system is applied to multimedia communication, and the communication of one-to-many connection is possible. The ZigBee uses a physical layer of IEEE (Institute of Electrical and Electronics Engineers) 802.15.4. The IEEE802.15.4 is a name of a short distance wireless network standard referred to as PAN (Personal Area Network) or W (Wireless) PAN.

The control device 110 is connected to an external server 113. The server 113 may be managed by any of the house 101, an electric power company, and a service provider. The information transmitted and received by the server 113 is power consumption information, life pattern information, power rates, weather information, natural disaster information, and information about power transaction, for example. Such information may be transmitted and received by a domestic electric consumption device (a television receiver, for example), and may be transmitted and received by a device outside home (a cellular phone, etc., for example). Such information may be displayed on a device having a display function, e.g. a television receiver, a cellular phone, PDA (Personal Digital Assistants), etc.

The control device 110 controlling each unit is constituted by a CPU, a RAM, a ROM, etc., and stored in the electric storage device 103 in this example. As a function of the control device 110, for example, functions such as the observation unit 40 and functions such as the battery management unit BMU can be applied. The control device 110 is connected to the electric storage device 103, the domestic power generation device 104, the power consumption device 105, the various sensors 111, and the server 113 through the information network 112, and has a function of adjusting a use amount of commercial power and a power generation amount. In addition, the control device 110 may have a function of performing power transaction in the power market, etc.

As illustrated above, not only power from the centralized power system 102 such as the thermal power 102*a*, the nuclear power 102*b*, and the hydraulic power 102*c* but also power generated by the domestic power generation device 104 (solar power generation, wind power generation) can be stored in the electric storage device 103. Therefore, even when power generated by the domestic power generation device 104 is varied, it is possible to perform control of keeping electric energy transmitted to the outside constant or discharging only a necessary amount. For example, it is also possible to adopt a use in which power obtained by solar power generation is stored in the electric storage device 103 and, at the same time, midnight power that is cheaper in cost during night is stored in the electric storage device 103 so that the power stored by the electric storage device 103 is discharged and used in the daytime period when the cost is high.

Note that although this example describes the case in which the control device 110 is stored in the electric storage device 103, the control device 110 may be stored in the smart meter 107 or may be constituted individually. Moreover, the power storage device 100 may be used for a plurality of households in an apartment house, or may be used for a plurality of detached houses.

3. Other Embodiments (Modification Examples)

Embodiments of the present technology are not limited to the above-described embodiments of the present technology, but may be modified and applied in various ways within the scope of the present technology without departing from the gist of the present technology.

For example, the numerical values, the configurations, the shapes, the materials, the ingredients, the manufacturing processes, and the like exemplified in the above-described embodiments are merely examples. Numerical values, configurations, shapes, materials, ingredients, manufacturing processes, and the like different therefrom may be used, as necessary.

The configurations, the methods, the processes, the shapes, the materials, the numerical values, and the like in the above-described embodiments may be combined without departing from the gist of the present technology.

It should be understood by those skilled in the art that various modifications, combinations, sub-combinations and alterations may occur depending on design requirements and other factors insofar as they are written within the scope of the appended claims or the equivalents thereof.

Additionally, the present technology may also be configured as below.

(1)

An electric storage system comprising:
a plurality of electric storage devices including a plurality of modules;
a battery management unit; and
a line concentrator connected with the battery management unit,
wherein the plurality of modules include a battery unit, a voltage measurement unit, a temperature measurement unit and a current measurement unit, and wherein the battery management unit is configured to control at least one of the plurality of electric storage devices based on an instruction transmitted from the line concentrator.

(2)

The electric storage system according to (1), wherein the battery management unit is configured to control charge/discharge of the electric storage device based on the instruction transmitted from the line concentrator.

(3)

The electric storage system according to any of (1) and (2), further comprising:
a common power line that is connected to the battery management unit and the line concentrator.

(4)

The electric storage system according to any of (1) to (3), the line concentrator is configured to acquire an identification information of the battery management unit from the battery management unit, and in a case where the identification information is consecutively acquired a plurality of times with no change, the line concentrator determines that the battery management unit is in a state of being connected to the line concentrator.

(5)

The electric storage system according to any of (1) to (4), wherein the line concentrator is configured to acquire an identification information of the battery management unit from the battery management unit, and wherein charge/discharge of the at least one of the plurality of electric storage devices is permitted in a case where an identification information set in the line concentrator and the identification information acquired from the battery management unit match.

(6)

The electric storage system according to (5), wherein charge/discharge of the at least one of the plurality of electric storage devices is prohibited in a case where the identification information set in the line concentrator and the identification information acquired from the battery management unit by the line concentrator do not match or the identification information is not acquired.

(7)

The electric storage system according to any of (1) to (6), wherein the line concentrator is configured to acquire the measurement data transmitted from the modules through the battery management unit.

(8)

The electric storage system according to any of (1) to (7), wherein further comprising a power conditioning system, wherein the power conditioning system is configured to control a first current value of a first current that flows to the at least one of the plurality of electric storage devices to a first value or lower by controlling a second current value of a second current that flows to the line concentrator in a case where a voltage of the at least one of the plurality of electric storage devices is within a first value range.

(9)

The electric storage system according to any of (1) to (8), further comprising a power conditioning system, wherein the power conditioning system is configured to control a first current value of a first current that flows to the at least one of the plurality of electric storage devices to a second value or lower by controlling a second current value of a second current that flows to the line concentrator in a case where a temperature of the at least one of the plurality of electric storage devices is within a second value range.

(10)

The electric storage system according to any of (8) and (9), wherein the power conditioning system is configured to control the second current value of the second current to a value calculated based on a minimum current value associated with at least one current that flows to the plurality of electric storage devices.

(11)

The electric storage system according to any of (8) and (9), wherein the power conditioning system is configured to control the second current value of the second current to a value calculated based on at least one of one half of a rated current value and one quarter of the rated current value associated with at least one of the plurality of electric storage devices.

(12)

The electric storage system according to any of (8) to (11), wherein the power conditioning system is configured to control the first current value of the first current to a third value or lower in a case where the voltage of the at least one of the plurality of electric storage devices is at least one of a voltage lower than a charge upper limit voltage and a voltage higher than a discharge lower limit voltage.

(13)

The electric storage system according to any of (1) to (12), wherein in a case where a voltage difference between the plurality of electric storage devices is outside of a value range, an alarm operation is performed, and charge/discharge of at least one of the plurality of electric storage devices is controlled.

(14)

The electric storage system according to any of (1) to (13), wherein a charge/discharge operation of the at least one of the plurality of electric storage devices is prohibited in a case where a first connection mode of the modules of the at least one of the plurality of electric storage devices set in the line concentrator and a second connection mode of the modules based on data that the line concentrator has received are different.

(15)

The electric storage system according to any of (1) to (14), wherein an alarm operation is performed in a case where a first connection mode of the battery management unit set in the line concentrator and a second connection mode of the battery management unit based on data that the line concentrator has received are different.

(16)

The electric storage system according to any of (1) to (15), wherein in a case where an abnormality occurs in at least one of the modules and the battery management unit, the line concentrator issues an instruction to stop charge/discharge to the at least one of the plurality of electric storage devices in which the abnormality has occurred.

(17)

The electric storage system according to any of (1) to (16), further comprising: a system controller connected with the line concentrator through a communication passage, wherein upon receiving an instruction from the system controller, the line concentrator transmits an instruction to the battery management unit.

(18)

The electric storage system according to any of (1) to (17), wherein the electric storage device is configured to supply power to at least one of a power network and a power generator, and the at least one of the power network and the power generator is configured to supply power to the electric storage device.

(19)

The electric storage system according to any of (1) to (18), wherein the voltage measurement unit is configured to measure a voltage of the battery unit, the temperature measurement is configured to measure a temperature of the battery unit, the current measurement unit is configured to measure a current of the battery unit.

(20)

The electric storage system according to any of (1) to (19), wherein the line concentrator is configured to control the plurality of modules.

REFERENCE SIGNS LIST 1 exterior
10 electric storage unit
11 positive electrode terminal
12 negative electrode terminal
13 voltage multiplexer
16 FET
23 voltage multiplexer
25 temperature measurement unit
26 temperature multiplexer
27 temperature measurement unit
28 current detection resistance
29 current detection amplifier
33 regulator
34 switch
35 power shut-down switch
40 observation unit
51 step
100 power storage device
101 home
102 centralized power system
102a thermal power
102b atomic power
102c hydraulic power
103 electric storage device
104 domestic power generation device
105 power consumption device
105a refrigerator
105b air conditioner
105c television receiver
105d bath
106 electric vehicle
106a electric car
106b hybrid car
106c electric motorcycle
107 smart meter
108 power hub
109 power network
110 control device
111 sensor
112 information network
113 server
BAT battery
BMU battery management unit
HUB line concentrator
INV power conditioning system
$L_{com}$ communication line
$L_{pw1}$ power line
$L_{pw2}$ power line
MO module
ST string
SYS system controller

The invention claimed is:

1. An electric storage system comprising:
a common power line;
a plurality of electric storage devices including a plurality of modules;
a battery management unit;
a line concentrator connected with the battery management unit; and
a system controller connected with the line concentrator through a communication passage,
wherein the plurality of modules include a battery unit, a voltage measurement unit, a temperature measurement unit and a current measurement unit,
wherein the battery management unit is configured to control at least one of the plurality of electric storage devices based on an instruction transmitted from the line concentrator,
wherein the common power line is connected to the battery management unit and the line concentrator, and
wherein the electric storage device is configured to stop charging/discharging in a case that a series number and parallel number of the modules of the electric storage device set in the line concentrator by the system controller are different from a series number and parallel number of the modules of the electric device detected by the line concentrator.

2. The electric storage system according to claim 1, wherein the battery management unit is configured to control charge/discharge of the electric storage device based on the instruction transmitted from the line concentrator.

3. The electric storage system according to claim 1, wherein the line concentrator is configured to acquire an identification information of the battery management unit from the battery management unit, and in a case where the identification information is consecutively acquired a plurality of times with no change, the line concentrator determines that the battery management unit is in a state of being connected to the line concentrator.

4. The electric storage system according to claim 1,
wherein the line concentrator is configured to acquire an identification information of the battery management unit from the battery management unit, and
wherein charge/discharge of the at least one of the plurality of electric storage devices is permitted in a case where an identification information set in the line concentrator and the identification information acquired from the battery management unit match.

5. The electric storage system according to claim 4, wherein charge/discharge of the at least one of the plurality of electric storage devices is prohibited in a case where the identification information set in the line concentrator and the identification information acquired from the battery management unit by the line concentrator do not match or the identification information is not acquired.

6. The electric storage system according to claim 1, wherein the line concentrator is configured to acquire the measurement data transmitted from the modules through the battery management unit.

7. The electric storage system according to claim 1, further comprising a power conditioning system, wherein the power conditioning system is configured to control
a first current value of a first current that flows to the at least one of the plurality of electric storage devices to a first value or lower by controlling a second current value of a second current that flows to the line concentrator in a case where a voltage of the at least one of the plurality of electric storage devices is within a first value range.

8. The electric storage system according to claim 1, further comprising a power conditioning system, wherein the power conditioning system is configured to control
a first current value of a first current that flows to the at least one of the plurality of electric storage devices to a second value or lower by controlling a second current value of a second current that flows to the line concentrator in a case where a temperature of the at least one of the plurality of electric storage devices is within a second value range.

9. The electric storage system according to claim 7, wherein the power conditioning system is configured to control the second current value of the second current to a value calculated based on a minimum current value associated with at least one current that flows to the plurality of electric storage devices.

10. The electric storage system according to claim 7, wherein the power conditioning system is configured to control the second current value of the second current to a value calculated based on at least one of one half of a rated current value and one quarter of the rated current value associated with at least one of the plurality of electric storage devices.

11. The electric storage system according to claim 7, wherein the power conditioning system is configured to control the first current value of the first current to a third value or lower in a case where the voltage of the at least one of the plurality of electric storage devices is at least one of a voltage lower than a charge upper limit voltage and a voltage higher than a discharge lower limit voltage.

12. The electric storage system according to claim 1, wherein in a case where a voltage difference between the plurality of electric storage devices is outside of a value range, an alarm operation is performed, and charge/discharge of at least one of the plurality of electric storage devices is controlled.

13. The electric storage system according to claim 1, wherein a charge/discharge operation of the at least one of the plurality of electric storage devices is prohibited in a case where a first connection mode of the modules of the at least one of the plurality of electric storage devices set in the line concentrator and a second connection mode of the modules based on data that the line concentrator has received are different.

14. The electric storage system according to claim 1, wherein an alarm operation is performed in a case where a first connection mode of the battery management unit set in the line concentrator and a second connection mode of the battery management unit based on data that the line concentrator has received are different.

15. The electric storage system according to claim 1, wherein in a case where an abnormality occurs in at least one of the modules and the battery management unit, the line concentrator issues an instruction to stop charge/discharge to the at least one of the plurality of electric storage devices in which the abnormality has occurred.

16. The electric storage system according to claim 1,
wherein upon receiving an instruction from the system controller, the line concentrator transmits an instruction to the battery management unit.

17. The electric storage system according to claim 1, wherein the electric storage device is configured to supply power to at least one of a power network and a power generator, and the at least one of the power network and the power generator is configured to supply power to the electric storage device.

18. The electric storage system according to claim 1, wherein the voltage measurement unit is configured to measure a voltage of the battery unit, the temperature measurement is configured to measure a temperature of the battery unit, the current measurement unit is configured to measure a current of the battery unit.

19. The electric storage system according to claim 1, wherein the line concentrator is configured to control the plurality of modules.

* * * * *